United States Patent [19]

Kubo et al.

[11] 4,428,259
[45] Jan. 31, 1984

[54] FAIL SAFE AUTOMATIC TRANSMISSION LOCK UP CLUTCH CONTROL SYSTEM

[75] Inventors: Seitoku Kubo, Toyota; Koujiro Kuramochi, Okazaki; Tatsuo Kyushima, Toyota, all of Japan

[73] Assignee: Toyota Jidosha Kabushiki Kaisha, Toyota, Japan

[21] Appl. No.: 287,864

[22] Filed: Jul. 28, 1981

[51] Int. Cl.³ .............................................. B60K 41/16
[52] U.S. Cl. ........................................ 74/867; 74/865; 192/3.31
[58] Field of Search ................... 192/0.033, 3.57, 3.32, 192/3.31, 3.3, 3.29, 3.28, 103 R; 74/869, 868, 867, 865, 732

[56] References Cited

U.S. PATENT DOCUMENTS 4,051,932 10/1977 Arai et al. ............................. 192/3.3
4,349,088 9/1982 Ito et al. ............................... 192/3.57

FOREIGN PATENT DOCUMENTS 56-42761 4/1981 Japan ...................................... 74/869
2061420A 5/1981 United Kingdom ................... 74/869

Primary Examiner—Leslie A. Braun
Assistant Examiner—D. Wright
Attorney, Agent, or Firm—Stevens, Davis, Miller & Mosher

[57] ABSTRACT

An automatic transmission includes a gear transmission mechanism with first and second friction mechanisms which are alternatively engaged by alternative supply of first and second actuating pressures thereto when the highest speed stage and the next to highest speed stage are alternatively engaged, and a torque converter including a lockup clutch. A transmission control system includes a pressure control system which controls the gear transmission mechanism by selectively supplying those actuating pressures and possibly others, and a lockup clutch control valve which controls the engagement of the lockup clutch. The lockup clutch control valve is switched to its disengage position when it receives neither a first nor a second control pressure, and is switched to an opposite position by supply of either the first or second control pressure, this opposite position being an engage position for the lockup clutch if governor pressure is over a first specified value. The first control pressure is provided when governor pressure is higher than a second specified value higher than the first specified value and also the first actuating pressure is present; and the second control pressure is provided, if governor pressure is over the first value, when the throttle pressure is lower than a third specified value and also the second actuating pressure is present.

2 Claims, 1 Drawing Figure

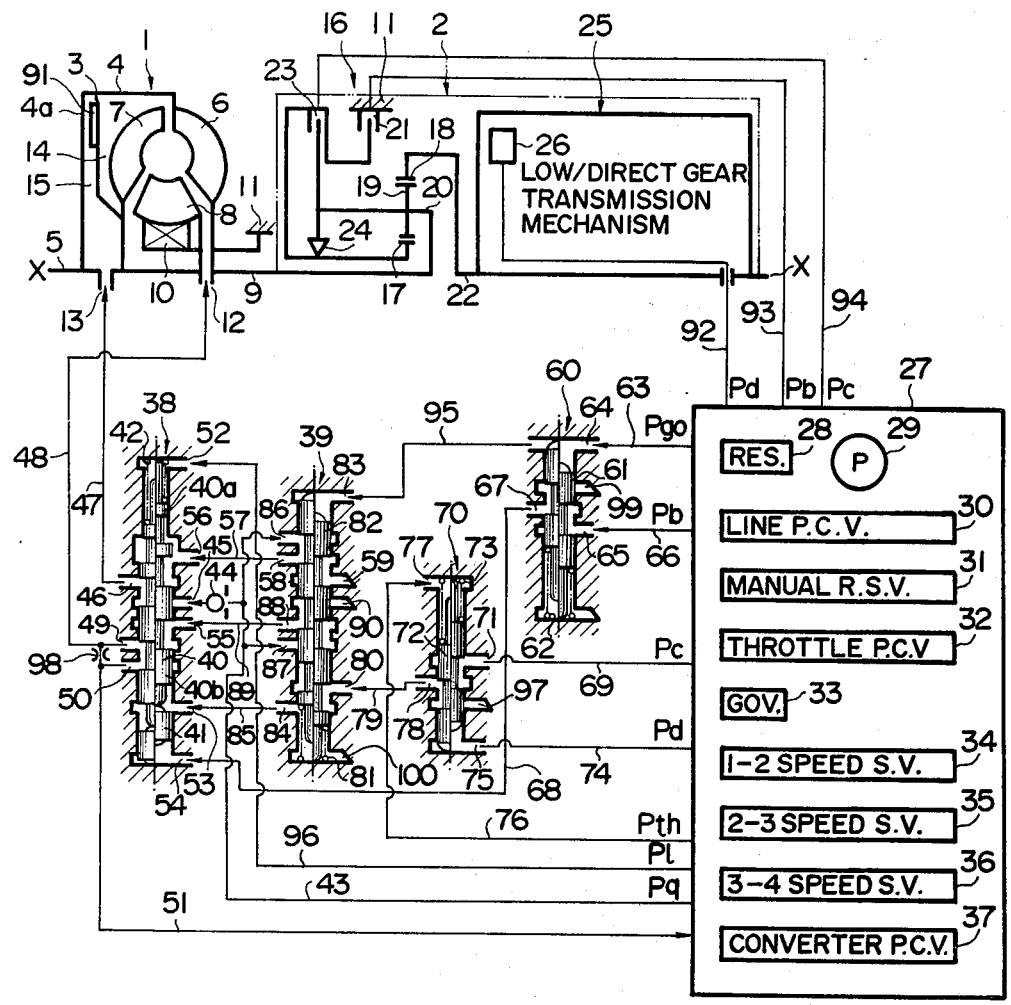

FAIL SAFE AUTOMATIC TRANSMISSION LOCK UP CLUTCH CONTROL SYSTEM

BACKGROUND OF THE INVENTION

The present invention relates to the field of automatic transmissions; more particularly, relates to the field of automatic transmissions with torque converters which are equipped with lock up clutches; and, yet more particularly, relates to the field of hydraulic fluid pressure control systems for such lock up clutches.

Various automatic transmissions for automotive vehicles are known in various forms. Such an automatic transmission conventionally includes a gear transmission mechanism which provides a plurality of speed stages and which is set to its various speed stages by selective supply of actuating hydraulic fluid pressures to various hydraulic fluid pressure activated friction engaging mechanisms comprised within the gear transmission mechanism such as multi plate clutches and multi plate brakes, said selective supply of actuating hydraulic fluid pressures being provided from a hydraulic fluid pressure control system, of which many forms are per se well known. Such a hydraulic fluid pressure control system typically requires a supply of line hydraulic fluid pressure for operation, and typically receives this supply of line hydraulic fluid pressure from a hydraulic fluid pressurizing pump by way of a line pressure regulation valve which modifies the output hydraulic fluid pressure produced by the pump by releasing a part of said output pressure back to a hydraulic fluid reservoir through a release port.

Further, such an automatic transmission conventionally includes a fluid torque converter, which provides a fluid coupling between the engine of the vehicle and the gear transmission mechanism, thus eliminating the need for any clutch system for the drive train of the vehicle, and allowing for the vehicle to be stationary while the engine is turning at a low rotational speed at or close to the idling speed without the engine stalling, as well as providing torque multiplication by fluid flow in a per se well known way when the vehicle is being accelerated at relatively low speed and relatively low engine rotational speed. Many such torque converters are of course presently well known. Generally, such a torque converter comprises: a housing of a generally toroidal shape, on the inside of which there are formed a series of vanes which constitute a pump impeller, and fixed to a power input shaft; a pump turbine member mounted within the housing as fixed to a power output shaft; and a stator member mounted within the housing via a one way brake on a fixed member. The housing of such a torque converter is kept filled with hydraulic fluid, which is pumped thereinto and is also drained therefrom as will be more fully explained later, and in a per se well known way the pump impeller, the stator member, and the turbine member cooperate, when the housing of the torque converter is thus filled with hydraulic fluid, to define a toroidal hydraulic fluid flow circulation system, circulation of hydraulic fluid around which in the general circulation fashion of a smoke ring is arranged to transfer torque in a conventional manner between the pump impeller and the turbine member of the torque converter.

This supply of hydraulic fluid for filling the torque converter is typically provided to the inside of the housing thereof via a first channel defined along or beside the central rotational axis thereof—in more detail, via a hole in one of the shafts passing along said central rotational axis or through a space defined between two concentric ones of such shafts; and the draining of hydraulic fluid from the torque converter is also typically performed in a similar manner, through a second such channel. The supply of hydraulic fluid is provided, generally in the art, from a torque converter hydraulic fluid pressure regulation valve which supplies a supply of hydraulic fluid at a regulated torque converter hydraulic fluid pressure, which is generally rather lower than the line hydraulic fluid pressure, to the torque converter.

Further, it has become more and more common nowadays for such a torque converter to be provided with a lock up clutch, which is a mechanical clutch which, when actuated, mechanically couples together the pump impeller and the turbine member of the torque converter with regard to their rotation, so that the above mentioned hydraulic torque transmission between the pump impeller and the turbine member no longer occurs or is relevant. The selective engagement of this lock up clutch is performed by a control device such as a hydraulic fluid pressure control device incorporated in the above mentioned hydraulic fluid pressure control system which controls the engagement of the various gear speed stages of the gear transmission mechanism, according to the operational conditions of the vehicle to which the torque converter incorporating this lock up clutch is fitted. In more detail, generally such a lock up clutch is engaged when the torque converter is required to transmit rotary power at a fairly high rotational speed, at which time the torque conversion function of the torque converter is not substantially required. In such a case, if the lock up clutch is not engaged, then, although the torque converter at this time provides a substantially direct power transmission function between its pump impeller and its turbine member, nevertheless a small amount, such as a few percent, of slippage between the pump impeller and the turbine member will inevitably occur, and this will waste a substantial amount of energy because of the useless churning of hydraulic fluid within the torque converter, and also will cause undesirable heating up of the hydraulic fluid contained within the torque converter. Thus, such a lock up clutch is engaged by the above mentioned hydraulic fluid pressure control device, generally speaking, when and only when the vehicle incorporating the torque converter is being driven at high speed with the gear transmission mechanism in a high gear speed stage, with the internal combustion engine of the vehicle thus operating at fairly high rotational speed, in which circumstances the actual hydraulic torque conversion function of the torque converter is not in fact particularly required. The provision of such a lock up clutch is effective for increasing fuel economy of the vehicle, especially when running on the open road such as on an expressway.

It is well known and conventional for such a lock up clutch to be engaged or disengaged according to the directions of supply and draining of the torque converter hydraulic fluid pressure to and from the interior of the housing of the torque converter. In other words, when the torque converter hydraulic fluid pressure as outlined above is being supplied to one channel which leads to the interior of the torque converter housing, and is being released from another channel, then it is arranged that the lock up clutch is engaged; and when the torque converter hydraulic fluid pressure is being supplied to said other channel, and is being drained from said one channel, then it is arranged that the lock up clutch is disengaged. Thus the supply of torque converter hydraulic fluid pressure to the torque converter from the torque converter pressure regulation valve is used for two purposes: to fill the torque converter with hydraulic fluid; and to selectively engage and disengage the lock up clutch, according to the direction of said supply. And this alternative supply of hydraulic fluid pressure to one channel, and draining from the other channel, and the switching over the channels, is typically performed by using a lock up clutch control valve, of which various forms have been suggested, in the prior art.

A typical prior art such system has controlled the lock up clutch to be engaged when and only when both the highest speed stage of the gear transmission mechanism, such as an overdrive speed stage, has been engaged, and also the vehicle road speed has been greater than a certain predetermined road speed value. This has been done, for example, by controlling such a lock up clutch control valve as described above by a control pressure which has been provided by switching an actuating hydraulic fluid pressure for a one of the friction engaging devices of the gear transmission mechanism which is engaged when and only when said highest speed stage is engaged by a lock up clutch interrupt valve whose valve element has been driven to and fro according to a balance relationship between governor hydraulic fluid pressure (indicative of vehicle road speed) and a spring force.

Such a system is satisfactory in some respects, but in fact it has been realized that it is desirable for the lock up clutch also to be engaged, in some circumstances, when a speed stage of the gear transmission mechanism other than the highest speed stage is engaged. In particular, it has been realized that it would be particularly desirable for the lock up clutch to be engaged, sometimes, when the next to the highest speed stage of the gear transmission mechanism is engaged, from the point of view of improving fuel economy of the vehicle.

However, it would not be acceptable for such an engagement of the lock up clutch to adversely affect the drivability and accelerability of the vehicle, during the engagement of such another speed stage than the highest speed stage. It should be noted that the problem of obtaining good acceleration of the vehicle is not really relevant during vehicle operation in the highest speed stage, since this speed stage is not an acceleration speed stage. However, in the lower speed stages, quick acceleration of the vehicle may be called for, and in this case the torque conversion or torque multiplication function of the torque converter is required, which means that the lock up clutch cannot be engaged at this time. Therefore a new design of lock up clutch control system is required.

Another problem that arises with a lock up clutch control system is that of the failure mode characteristic thereof. In detail, if such a control valve as a lock up clutch control valve of the sort described above should stick in its position in which it engages the lock up clutch, or the so called lock up clutch engage position, and then the vehicle speed should gradually drop until the vehicle comes almost or completely to a halt, then the problem will arise that the engine of the vehicle will snatch, stutter, or stall. This is completely unacceptable, and will render the vehicle inoperable, because the fluid clutch function of the torque converter, which allows the engine of the vehicle to continue rotating at low rotational speed when the vehicle has come to rest, is no longer available. Accordingly, some fail safe system must be provided for ensuring that, even if the lock up clutch control valve should stick, the lock up clutch cannot remain engaged when the vehicle speed is very low. Of course, in the event that, as suggested above, the lock up clutch should be engaged during the engagement of other transmission speed stages than the highest speed stage, then some form of fail safe mechanism must be provided for operation in those speed stages also.

SUMMARY OF THE INVENTION

Accordingly, it is the primary object of the present invention to provide a control system for an automatic transmission including a fluid torque converter with a lock up clutch, which meets with and overcomes the above described problems.

It is a further object of the present invention to provide a control system for an automatic transmission including a fluid torque converter with a lock up clutch, which provides lock up clutch engagement, at appropriate times and in appropriate conditions, when the gear transmission mechanism of the automatic transmission is selected to other speed stages than its highest speed stage, as well as when the automatic transmission is selected to its highest speed stage.

It is a further object of the present invention to provide a control system for an automatic transmission including a fluid torque converter with a lock up clutch, which provides lock up clutch engagement, at appropriate times and in appropriate conditions, when the gear transmission mechanism of the automatic transmission is selected to its next speed stage below its highest speed stage, as well as when the automatic transmission is selected to its highest speed stage.

It is a further object of the present invention to provide a control system for an automatic transmission including a fluid torque converter with a lock up clutch, which provides lock up clutch engagement at some times when the gear transmission mechanism of the automatic transmission is selected to other speed stages than its highest speed stage, but which disengages the lock up clutch when the torque multiplication function of the torque converter is required in such other speed stages, as during vehicle acceleration.

It is a further object of the present invention to provide a control system for an automatic transmission including a fluid torque converter with a lock up clutch, in the operation of which engagement of the lock up clutch, when the vehicle comes to a complete halt, is positively prevented.

It is a further object of the present invention to provide a control system for an automatic transmission including a fluid torque converter with a lock up clutch, in the operation of which engine stalling of the vehicle incorporating the transmission is positively prevented.

It is a further object of the present invention to provide a control system for an automatic transmission including a fluid torque converter with a lock up clutch, which positively ensures that the lock up clutch is disengaged when vehicle road speed drops to a low value.

It is a further object of the present invention to provide a control system for an automatic transmission including a fluid torque converter with a lock up clutch, which provides good drivability for the vehicle incorporating the transmission.

It is a further object of the present invention to provide a control system for an automatic transmission including a fluid torque converter with a lock up clutch, which provides a good acceleration characteristic for the vehicle incorporating the transmission.

It is a further object of the present invention to provide a control system for an automatic transmission including a fluid torque converter with a lock up clutch, in which, even if a lock up clutch control valve should stick, the vehicle incorporating the transmission should still be drivable.

It is a further object of the present invention to provide a control system for an automatic transmission including a fluid torque converter with a lock up clutch, in which, even if a lock up clutch control valve should stick, the fluid clutch function of the torque converter should still be available, for bringing the vehicle incorporating the transmission to rest, and for driving said vehicle away from rest.

It is a further object of the present invention to provide a control system for an automatic transmission including a fluid torque converter with a lock up clutch, which maximizes fuel economy of the vehicle equipped with said automatic transmission.

According to the present invention, these and other objects are accomplished by, in an automatic transmission for an engine driven vehicle, comprising: (a) a gear transmission mechanism, which can provide a plurality of forward speed stage including a highest speed stage and a next to highest speed stage, and which comprises a plurality of hydraulic fluid pressure activated friction engaging mechanisms combinations of which are selectively actuated by selective supply of actuating hydraulic fluid pressures thereto so as to engage said plurality of speed stages, said plurality of hydraulic fluid pressure activated friction engaging mechanisms including a first friction engaging mechanism which is engaged by supply of a first actuating hydraulic fluid pressure thereto when and only when said gear transmission mechanism is providing its said highest speed stage and a second friction engaging mechanism which is engaged by supply of a second actuating hydraulic fluid pressure thereto when said gear transmission mechanism is providing its said next to highest speed stage but which is not engaged when said gear transmission mechanism is providing its said highest speed stage, said second actuating hydraulic fluid pressure not being present when said gear transmission mechanism is providing its said highest speed stage; (b) a torque converter, the interior of which is filled with hydraulic fluid, which comprises a lock up clutch and a first and a second hydraulic fluid channel, said lock up clutch being respectively selectively disengaged or engaged, according as to whether hydraulic fluid pressure is supplied to said first hydraulic fluid channel and is released from said second hydraulic fluid channel, or is supplied to said second hydraulic fluid channel and is released from said first hydraulic fluid channel: a transmission control system, comprising: (c) a source of regulated torque converter hydraulic fluid pressure for filling the inside of said torque converter with hydraulic fluid; (d) a hydraulic fluid pressure control system which controls said gear transmission mechanism by said selective supply of said combinations of said hydraulic fluid pressures including said first actuating hydraulic fluid pressure and said second actuating hydraulic fluid pressure thereto so as selectively to engage various ones of said plurality of speed stages, comprising a governor hydraulic fluid pressure control valve which produces a governor hydraulic fluid pressure which is representative of vehicle speed and which increases with increasing vehicle speed, and a throttle hydraulic fluid pressure control valve which produces a throttle hydraulic fluid pressure which is representative of the load on said engine of said vehicle and which increases with increasing engine load; and (e) a lock up clutch control valve, which has a first switched position and a second switched position, which when in its said first switched position switches said first hydraulic fluid channel so as to supply thereto a supply of said torque converter hydraulic fluid pressure and switches said second hydraulic fluid channel so as to release hydraulic fluid therefrom, and which when in its said second switched position, if the current value of said governor hydraulic fluid pressure is over a first predetermined pressure value, switches said second hydraulic fluid channel so as to supply thereto a supply of said torque converter hydraulic fluid pressure and switches said first hydraulic fluid channel so as to release hydraulic fluid therefrom, said lock up clutch control valve being switched to its said second switched position by supply of either a first control hydraulic fluid pressure or a second control hydraulic fluid pressure thereto, and being always switched to its said first switched position in the simultaneous absence of said first and said second control hydraulic fluid pressures; (f) said first control hydraulic fluid pressure being provided to said lock up clutch control valve when and only when said governor hydraulic fluid pressure is higher than a second predetermined pressure value which is higher than said first predetermined pressure value and also said first actuating hydraulic fluid pressure is present; and (g) said second control hydraulic fluid pressure being provided to said lock up clutch control valve, if the current value of said governor hydraulic fluid pressure is over said first predetermined pressure value, when and only when said throttle hydraulic fluid pressure is lower than a third predetermined pressure value and also said second actuating hydraulic fluid pressure is present.

According to such a structure, provided that governor hydraulic fluid pressure is higher than said first predetermined value, i.e. provided that vehicle road speed is over a first predetermined road speed value (which is typically set to be quite low), the selective disengagement and engagement of the lock up clutch is controlled according as to whether the lock up clutch control valve is respectively selected to its said first position or its said second position; and, in fact, the lock up clutch is engaged when either said first control hydraulic fluid pressure is provided, or said second control hydraulic fluid pressure is provided, and is otherwise disengaged. In other words, (again provided that vehicle road speed is over said first predetermined road speed value) the lock up clutch is engaged, when the gear transmission mechanism is selected to said highest speed stage thereof, when and only when said governor hydraulic fluid pressure is higher than said second predetermined pressure value which is higher than said first predetermined pressure value, i.e. when vehicle speed is higher than a second predetermined road speed value which is higher than said first predetermined road speed value; and, when the gear transmission mechanism is selected to said next to highest speed stage thereof, the lock up clutch is engaged, when and only when said throttle hydraulic fluid pressure is lower than said third predetermined pressure value, i.e. when vehicle throttle opening is less than a certain predetermined throttle opening. This last feature ensures that the vehicle retains good accelerability in such a speed stage below the highest speed stage.

Further, according to a particular aspect of the present invention, these and other objects are more particularly and concretely accomplished by a transmission control system as described above, wherein said lock up clutch control valve comprises a housing within which is formed a bore, and a valve spool member and a piston member coaxially fitted within said bore so as to abut against one another by their ends; a first chamber being defined at the end of said piston member remote from said valve spool member, and a second chamber being defined around the meeting ends of said valve spool member and said piston member; said valve spool member being biased in the direction towards said first chamber; and one of said first and said second control hydraulic fluid pressures being supplied to said first chamber, while the other is supplied to said second chamber; said first switched position of said lock up clutch control valve being the state thereof in which said valve spool member is biased towards said first chamber, while said second switched position of said lock up clutch control valve is the state thereof in which said valve spool member is biased away from said first chamber.

According to such a particular construction, the first and the second chamber are so arranged that supply of control hydraulic fluid pressure to either one of them displaces the valve spool member in the direction away from said first and the second chambers, i.e. towards said second switched position thereof. This provides a structure whereby said lock up clutch control valve is constructed to respond to either of two independent control hydraulic fluid pressures.

Further, according to a particular aspect of the present invention, these and other objects are more particularly and concretely accomplished by such a transmission control system as described above, further comprising a first lock up clutch interrupt valve which has a first switched position and a second switched position, which when in its said first switched position switches a supply of said first actuating hydraulic fluid pressure so as to supply said first actuating hydraulic fluid pressure to said lock up clutch control valve as said first control hydraulic fluid pressure, and which when in its said second switched position does not switch said supply of said first actuating hydraulic fluid pressure so as to supply said first actuating hydraulic fluid pressure to said lock up clutch control valve as said first control hydraulic fluid pressure, so that said lock up clutch control valve in this case is not supplied with any such first control hydraulic fluid pressure; said first lock up clutch interrupt valve being supplied with said governor hydraulic fluid pressure by said hydraulic fluid pressure control system, and being switched to its said second switched position when the pressure value of said governor hydraulic fluid pressure is less than said second predetermined pressure value, while being switched to its said first switched position when the pressure value of said governor hydraulic fluid pressure is greater than said second predetermined pressure value.

According to the provision of such a first lock up clutch interrupt valve with such a function, the first control hydraulic fluid pressure is generated in the proper circumstances as specified above; and the to and fro switching action of said first lock up clutch interrupt valve is effective for controlling the supply of said first control hydraulic fluid pressure.

Further, according to a particular aspect of the present invention, these and other objects are more particularly and concretely accomplished by such a transmission control system as described above, further comprising a second lock up clutch interrupt valve which has a first switched position and a second switched position, which when in its said first switched position switches supply of said second actuating hydraulic fluid pressure so as to supply said second actuating hydraulic fluid pressure towards said lock up clutch control valve as said second control hydraulic fluid pressure, and which when in its said second switched position does not switch said supply of said second actuating hydraulic fluid pressure so as to supply said second actuating hydraulic fluid pressure towards said lock up clutch control valve as said second control hydraulic fluid pressure, so that said lock up clutch control valve in this case is not supplied with any such second control hydraulic fluid pressure; said second lock up clutch interrupt valve being supplied by said hydraulic fluid pressure control system with a third actuating hydraulic fluid pressure, when it is present, and when not so supplied being positively switched to its said second switched position irrespective of any other control pressures supplied thereto; said second lock up clutch interrupt valve further being supplied with said throttle hydraulic fluid pressure by said hydraulic fluid pressure control system; and, when said second lock up clutch interrupt valve is being supplied with said third actuating hydraulic fluid pressure, said second lock up clutch interrupt valve being switched to its said first switched position when the pressure value of said throttle hydraulic fluid pressure is less then said third predetermined pressure value and being switched to its said second switched position when the pressure value of said throttle hydraulic fluid pressure is greater than said third predetermined pressure value; said supply of said second actuating hydraulic fluid pressure which is being supplied towards said lock up clutch control valve as said second control hydraulic fluid pressure being intercepted, if and only if the current value of said governor hydraulic fluid pressure is not over said first predetermined pressure value.

According to the provision of such a second lock up clutch interrupt valve with such a function, the second control hydraulic fluid pressure is generated in the proper circumstances as specified above; and the to and fro switching action of said second lock up clutch interrupt valve is effective for controlling the generation and supply of said second control hydraulic fluid pressure. It should be noted that the second control hydraulic fluid pressure is only supplied towards said lock up clutch control valve; and in fact, as will be seen later, supply of this second control hydraulic fluid pressure may be interrupted, before it reaches said lock up clutch control valve, if governor hydraulic fluid pressure is lower than said first predetermined pressure value. It should also be noted that said third actuating hydraulic fluid pressure may be a hydraulic fluid pressure which is present when said gear transmission mechanism is engaged to the highest speed stage and the next to highest speed stage, as in the preferred embodiment of the present invention to be described hereinafter; or may by a hydraulic fluid pressure which is present when said gear transmission mechanism is engaged to any forward speed stage higher than a predetermined speed stage.

Further, according to a particular aspect of the present invention, these and other objects are more particularly and concretely accomplished by such a transmission control system as described above, further comprising a fail safe valve which has a first switched position and a second switched position, and which when said lock up clutch control valve is in its said second switched position is communicated via said lock up clutch control valve to said first and said second hydraulic fluid channels; at which time said fail safe valve: when in its said first switched position, switches said first hydraulic fluid channel so as to supply thereto a supply of said torque converter hydraulic fluid pressure and switches said second hydraulic fluid channel so as to release hydraulic fluid therefrom; and, when in its said second switched position, switches said second hydraulic fluid channel so as to supply thereto a supply of said torque converter hydraulic fluid pressure and switches said first hydraulic fluid channel so as to release hydraulic fluid therefrom; said fail safe valve being switched to its said second switched position when governor hydraulic fluid pressure is greater than said first predetermined pressure value, and being switched to its said first switched position when governor hydraulic fluid pressure is less than said first predetermined pressure value.

According to the provision of such a fail safe valve with such a function, the selective controlling of disengagement and engagement of the lock up clutch, when the lock up clutch control valve is in its said second switched position, is controlled according as to whether the fail safe valve is respectively selected to its said first position or its said second position; and, in fact, the lock up clutch is engaged when governor pressure is greater than said first predetermined pressure value, and is disengaged when governor pressure is less than said first predetermined pressure value; in other words, the lock up clutch is engaged when the vehicle road speed is over said first predetermined road speed value, and is disengaged when the vehicle road speed is below said first predetermined road speed value. This ensures that the vehicle road speed cannot drop to less than said first predetermined road speed value without disengaging the lock up clutch, even if the lock up clutch control valve should become stuck in its said second position; and thus stalling or snatching of the engine of the vehicle, due to the lock up clutch improperly remaining engaged when the vehicle comes almost or completely to a standstill, is positively prevented.

Further, according to a yet more detailed specialization of this fail safe valve, said fail safe valve may control supply of said second control hydraulic fluid pressure to said lock up clutch control valve; said fail safe valve, when in its said first position, interrupting said supply of said second control hydraulic fluid pressure to said lock up clutch control valve, so that at this time said lock up clutch control valve is definitely not supplied with said second control hydraulic fluid pressure; and said fail safe valve, when in its said second position, allowing communication of said supply of said second control hydraulic fluid pressure to said lock up clutch control valve.

According to such an additional function, the fail safe valve also prevents the supply of the second control hydraulic fluid pressure, when the vehicle road speed is below said first predetermined road speed value. This ensures that no problem can occur with regard to the lock up clutch control valve being improperly shifted, at that time.

BRIEF DESCRIPTION OF THE DRAWING

The present invention will now be shown and described with reference to a preferred embodiment thereof, and with reference to the illustrative drawing. It should be clearly understood, however, that the description of the embodiment, and the drawing, are both given purely for the purposes of explanation and exemplification only, and are not intended to be limitative of the scope of the present invention in any way, since the scope of the present invention is to be defined solely by the legitimate and proper scope of the appended claims. In the drawing, the sole FIGURE thereof is a schematic part block diagrammatical part sectional view, showing said preferred embodiment of the automatic transmission lock up clutch control system according to the present invention, with parts thereof which are per se well known in the art and conventional shown as blocks or as diagrammatic line drawings for the convenience of description, and with certain valves shown in greater detail by longitudinal cross sectional views.

DESCRIPTION OF THE PREFERRED EMBODIMENT

The preferred embodiment of the lock up clutch control system according to the present invention will now be described with reference to the appended drawing, which is a schematic view of an automatic transmission as controlled by said preferred embodiment. In the FIGURE, the shown automatic transmission comprises a torque converter 1, a gear transmission mechanism 2, and a hydraulic fluid pressure control system.

THE TORQUE CONVERTER

The torque converter 1 comprises a torque converter system and a lock up clutch assembly. A rotatable power input shaft 5, whose central rotational axis is indicated in the FIGURE by the line X—X, receives supply of input rotational power (which rotates about a preferred rotational direction) from the crankshaft of an internal combustion engine of the vehicle to which the automatic transmission is fitted, neither the engine nor the crankshaft being shown in the FIGURE. This power input shaft 5 is rotationally coupled to a housing 4 of the torque converter 1, which rotates integrally with said power input shaft 5. Said housing 4 has an end wall 4a. A pump impeller 6 formed with vanes thereon is rotationally coupled to a part on the right in the FIGURE of the inside of the torque converter housing 4, and may be formed integrally therewith. Coaxially with the power input shaft 5 there is provided a power output shaft 9 of the torque converter 1, and this power output shaft 9 is rotationally coupled to a turbine member with vanes formed thereon, designated in the FIGURE by the reference numeral 7. Thus the rotational axis of this power output shaft 9, also, is the line shown by X—X in the FIGURE. A stator member 8 with vanes formed thereon is mounted, via a one way brake 10, to a fixed member 11 of the torque converter, so as to be rotatable with respect thereto in said one preferred rotational direction only, again about the axial line shown by X—X in the FIGURE. In a per se conventional way, the pump impeller 6, the stator member 8, and the turbine member 7 cooperate, when the housing 4 of the torque converter 1 is filled with hydraulic fluid, to define a toroidal hydraulic fluid flow circulation system, which is adapted to transfer torque in a conventional fashion between the pump impeller 6 and the turbine member 7, by circulation of hydraulic fluid between the pump impeller 6, the turbine member 7, and the stator member 8 in the general circulation fashion of a smoke ring.

CONSTRUCTION OF THE LOCK UP CLUTCH ASSEMBLY

The torque converter 1 is provided with a lock up clutch assembly of a per se well known sort, which will now be explained. To the power output shaft 9 there is fixedly coupled (again coaxially about the axial line X—X) a lock up clutch plate 3, on the left hand side of which in the FIGURE, i.e. on the side thereof closest to the end wall 4a of the torque converter housing 4, there is fixed a lining 91 made of a material adapted to frictionally engage against said end wall 4a of the torque converter housing 4. Accordingly, in combination with said end wall 4a, said clutch plate 3 constitutes a lock up clutch assembly, which, when and only when said clutch plate 3 is impelled towards said end wall 4a, in a manner which will be explained hereinafter, rotationally directly engages said clutch plate 3 to said torque converter housing 4, i.e. rotationally directly engages together said power input shaft 5 and said power output shaft 9.

The lock up clutch assembly is engaged and disengaged by the direction of supply of actuating hydraulic fluid pressure thereto, in a selective fashion, as will now be explained. Two hydraulic fluid apertures, a first hydraulic fluid aperture 12 and a second hydraulic fluid aperture 13, are provided for conducting hydraulic fluid into and out of the inside space within the torque converter housing 4, at parts of the torque converter housing 4 near the central rotational axis X—X thereof. In fact, these apertures 12 and 13 are only schematically shown in the drawing; the practical form of construction therefor, as is per se well known in the art, is for these apertures 12 and 13 to open to the inner space within the torque converter housing 4 from within openings in shafts which extend along the axis of the torque converter, for instance from within central axial holes through the power input shaft 5 and/or the power output shaft 9 of the torque converter 1. The first hydraulic fluid aperture 12 opens to the part of the space within the torque converter housing 4 which lies to the right of the clutch plate 3 in the FIGURE, and which is designated by the reference numeral 14, and the second hydraulic fluid aperture 13 opens to the part of the space within the torque converter housing 4 which lies between the end wall 4a of the torque converter housing 4 and the clutch plate 3 in the FIGURE, to the left of the clutch plate 3 in the FIGURE, said space being designated by the reference numeral 15.

OPERATION OF THE LOCK UP CLUTCH ASSEMBLY

Accordingly, when a flow of hydraulic fluid is supplied into the interior space 15 of the torque converter housing 4 which lies between the end wall 4a of the torque converter housing 4 and the clutch plate 3 in the FIGURE in through the second hydraulic fluid aperture 13, and is taken out of the interior space 14 of the torque converter housing 4 which lies to the right of the clutch plate 3 in the FIGURE from the first hydraulic fluid aperture 12, this flow of hydraulic fluid of course serving to fill the inside of the torque converter housing 4 with hydraulic fluid as is required for its operation, then the excess of the fluid pressure on the left side in the FIGURE of the clutch plate 3 over the fluid pressure on the right side thereof, due to the rather restricted size of the space available for passage of hydraulic fluid past the lining 91, between said lining 91 and the end wall 4a of the torque converter housing 4, ensures that the clutch plate 3 as a whole is biased to the right in the FIGURE, and does not substantially touch the end wall 4a of the torque converter housing 4, via the lining 91. In this operational state, the clutch plate 3 and the torque converter housing 4 are not substantially mechanically rotationally coupled together, and accordingly the power input shaft 5 and the power output shaft 9 of the torque converter 1 are not mechanically coupled together with regard to their rotation, but instead are only rotationally coupled together via the aforementioned circulation of hydraulic fluid within the torque converter 1, i.e. are only rotationally coupled together in a torque converting fashion, according to the normal per se well known functioning of the torque converter 1. In other words, the lock up clutch assembly is disengaged, by the supply of hydraulic fluid into the interior space 15 of the torque converter housing 4 in through the second hydraulic fluid aperture 13, and the taking of hydraulic fluid out of the interior space 14 of the torque converter housing 4 from the first hydraulic fluid aperture 12.

On the other hand, when a flow of hydraulic fluid is supplied into the interior space 14 of the torque converter housing which lies to the right of the clutch plate 3 in the FIGURE 4 in through the first hydraulic fluid aperture 12, and is taken out of the interior space 15 of the torque converter housing 4 which lies between the end wall 4a of the torque converter housing 4 and the clutch plate 3 in the FIGURE from the second hydraulic fluid aperture 13, this flow of hydraulic fluid again of course serving to fill the inside of the torque converter housing 4 with hydraulic fluid as is required for its operation, then the excess of the fluid pressure on the right side in the FIGURE of the clutch plate 3 over the fluid pressure on the left side thereof, due to the rather restricted size of the space available for passage of hydraulic fluid past the lining 91, between said lining 91 and the end wall 4a of the torque converter housing 4, ensures that the clutch plate 3 as a whole is biased to the left in the FIGURE, and is pressed tightly against the end wall 4a of the torque converter housing 4, via the lining 91. In this operational state, the clutch plate 3 and the torque converter housing 4 are mechanically rotationally coupled together, and accordingly the power input shaft 5 and the power output shaft 9 of the torque converter 1 are mechanically coupled together with regard to their rotation, and their rotational coupling together by the circulation of hydraulic fluid within the torque converter 1, according to the normal per se well known functioning of the torque converter 1, ceases to be of any importance. In this condition, the circulation of hydraulic fluid within the torque converter 1 soon ceases, and the body of hydraulic fluid within the housing 4 of the torque converter 1, the housing 4, the pump impeller 6, the turbine member 7, and the stator member 8 soon are rotating together as one unit, all at substantially the same rotational speed. In other words, the lock up clutch assembly is engaged, by the supply of hydraulic fluid into the interior space 14 of the torque converter housing 4 in through the first hydraulic fluid aperture 12, and the taking of hydraulic fluid out of the interior space 15 of the torque converter housing 4 from the second hydraulic fluid aperture 13. This mode of engaging and disengaging the lock up clutch assembly is per se well known in the art.

As will be seen later, the lock up clutch assembly is engaged, during highest speed stage or overdrive speed stage operation of the gear transmission mechanism 2, when and only when the vehicle road speed is higher than a certain predetermined value; and the lock up clutch assembly is engaged, during next to highest speed stage operation or directly connected speed stage operation of the gear transmission mechanism 2, when and only when the vehicle road speed is higher than another certain predetermined value and also the throttle opening is less than a certain predetermined value. Thus, when the lock up clutch assembly is to be engaged, i.e. when a flow of hydraulic fluid is being supplied into the interior space 14 of the torque converter housing 4 in through the first hydraulic fluid aperture 12, and is being taken out of the other interior space 15 of the torque converter housing 4 from the second hydraulic fluid aperture 13, then typically the vehicle incorporating this transmission is operating at fairly high engine rotational speed. On the other hand, when the lock up clutch assembly is to be disengaged, i.e. when a flow of hydraulic fluid is being supplied into the interior space 15 of the torque converter housing 4 in through the second hydraulic fluid aperture 13, and is being taken out of the other interior space 14 of the torque cnverter housing 4 from the first hydraulic fluid aperture 12, then typically the internal combustion engine of the vehicle incorporating this transmission is being operated at quite low engine rotational speed or at idling speed. As stated above, the exception to this is when the vehicle is being accelerated hard, i.e. with high throttle opening, in the next to highest speed stage or the directly connected speed stage of the gear transmission mechanism 2, in which case the lock up clutch is disengaged, even though the engine rotational speed may be high. This is done in order to obtain the beneficial accelerating effects of torque multiplication provided by the torque converter 1, and will be explained in more detail later.

THE GEAR TRANSMISSION MECHANISM

The gear transmission mechanism 2 is only shown as a schematic block in the drawing, because many versions thereof are already per se well known and conventional. This gear transmission mechanism 2 is made up of an overdrive mechanism 16 and a low/direct gear mechanism 25. The power output shaft 9 of the torque converter 1 also serves as the power input shaft for the overdrive mechanism 16, and the overdrive mechanism 16 has a power output shaft 22 which also serves as the power input shaft for the low/direct gear mechanism 25, said shaft 22, again, being rotatable about its central rotational axis which lies along the axial line shown by X—X in the FIGURE.

CONSTRUCTION OF THE OVERDRIVE MECHANISM

The overdrive mechanism 16 will now be described. This overdrive mechanism 16 comprises an overdrive casing 11. The shaft 9, which serves to transmit rotational power from the torque converter 1 to the overdrive mechanism 16, is connected to a carrier 20 of a planetary gear mechanism of the overdrive mechanism 16, and on the carrier 20 there is rotatably mounted a planetary pinion 19. Of course, in fact, several planetary pinions such as the planetary pinion 19 are incorporated in this planetary gear mechanism, but only one of them is schematically shown in the FIGURE. This planetary pinion 19 rotates in a per se conventional way around a sun gear 17, with which its inside is meshed; and the outside of the planetary pinion 19 is meshed with a ring gear 18. Between the sun gear 17 and the carrier 20 there are provided, in parallel, a one way clutch 24 for always rotationally connecting them together in one rotational direction only, and a multi plate clutch 23 for selectively rotationally connecting them together in both rotational directions; and further between the sun gear 17 and the casing 11 of the overdrive mechanism 16 there is provided a multi plate brake 21, for selectively rotationally connecting them together in both rotational directions. The multi plate brake 21 and the multi plate clutch 23 are both of them constituted as hydraulic fluid pressure activated friction engaging mechanisms of per se well known sorts, and are both of them adapted to be selectively engaged and disengaged by selective supply of hydraulic fluid pressures Pb and Pc respectively thereto, via hydraulic fluid conduits 93 and 94 respectively, from a hydraulic fluid pressure transmission control system 27, as will be explained later. The ring gear 18 is connected to the above mentioned shaft 22, which as explained above serves as the power output shaft of the overdrive mechanism 16.

OPERATION OF THE OVERDRIVE MECHANISM

Thus, when actuating hydraulic fluid pressure Pb is supplied from the hydraulic fluid pressure control system 27 via the hydraulic fluid conduit 93 to the multi plate brake 21 of the overdrive mechanism 16, so that the multi plate brake 21 is engaged, and no actuating hydraulic fluid pressure Pc is supplied from the hydraulic fluid pressure control system 27 via the hydraulic fluid conduit 94 to the multi plate clutch 23 of the overdrive mechanism 16, so that the multi plate clutch 23 is disengaged, then the sun gear 17 is rotationally fixed to the housing 11 of the overdrive mechanism 16, while the carrier 20 is free to rotate with respect to the sun gear 17 and the housing 11 in the rotational direction which is the one required for forward operation, and accordingly in a per se well known way the overdrive mechanism 16 operates (during forward vehicle operation only) in its mode of increasing rotational speed, in which its power output shaft 22 rotates at a higher rotational speed than does its power input shaft 9. On the other hand, when no actuating hydraulic fluid pressure Pb is supplied from the hydraulic fluid pressure control system 27 via the hydraulic fluid conduit 93 to the multi plate brake 21 of the overdrive mechanism 16, so that the multi plate brake 21 is disengaged, and actuating hydraulic fluid pressure Pc is supplied from the hydraulic fluid pressure control system 27 via the hydraulic fluid conduit 94 to the multi plate clutch 23 of the overdrive mechanism 16, so that the multi plate clutch 23 is engaged, then the sun gear 17 is rotationally fixed to the carrier 20 in both rotational directions, while this rotationally coupled combination of the sun gear 17 and the carrier 20 is free to rotate with respect to the housing 11 of the overdrive mechanism 16, and accordingly in a per se well known way the overdrive mechanism 16 operates in its mode of providing direct rotational coupling, in which its power output shaft 22 rotates at the same rotational speed as does its power input shaft 9.

FUNCTION OF THE LOW/DIRECT GEAR TRANSMISSION MECHANISM

Now the low/direct gear transmission mechanism 25 will be described, with regard to its function. The low/direct gear transmission mechanism 25 incorporates several per se well known hydraulic fluid pressure activated friction engagement mechanisms such as multi plate clutches and multi plate brakes, one of which is schematically shown by a block denoted by the reference numeral 26 in the drawing, and, according to selective supply of one or another particular combination of activating hydraulic fluid pressures such as the hydraulic fluid pressure Pd from the hydraulic fluid pressure control system 27 which will be described hereinafter to various combinations of these friction engagement mechanisms such as the friction engagement mechanism 26 via hydraulic fluid conduits such as a hydraulic fluid conduit 92 which leads to said friction engagement mechanism 26, in a per se well known way the low/direct gear transmission mechanism 25 is controlled to provide one or another of a plurality of different transmission ratios, including a directly connected transmission ratio and various speed reduction ratios, between its power input shaft 22 and its power output shaft, which is not particularly shown in the FIGURE but which again rotates about the axis shown by the line X—X in the FIGURE. The hydraulic fluid pressure activated friction engagement mechanism 26 is selectively supplied with its said activating hydraulic fluid pressure Pd, or alternatively is relieved of said supply of hydraulic fluid pressure Pd, via the hydraulic fluid conduit 92, and, when the hydraulic fluid pressure activated friction engagement mechanism 26 is so supplied with activating hydraulic fluid pressure Pd, and appropriate combinations of the other hydraulic fluid pressure activated friction engagement mechanisms which are not particularly shown of the low/direct gear transmission mechanism 25 are supplied with activating hydraulic fluid pressures via conduits which are also not shown, then the low/direct gear transmission mechanism 25 is controlled to provide its directly connected speed stage, in which its power output shaft rotates at the same rotational speed as does its power input shaft 22; while, on the other hand, when the hydraulic fluid pressure activated friction engagement mechanism 26 is not supplied with such activating hydraulic fluid pressure Pd, and various other appropriate combinations of the other hydraulic fluid pressure activated friction engagement mechanisms of the low/direct gear transmission mechanism 25 are supplied with activating hydraulic fluid pressures, then the low/direct gear transmission mechanism 25 is controlled to provide various reducing speed stages, in which its power output shaft rotates at a lower rotational speed than does its power input shaft 22. In other words, the hydraulic fluid pressure activated friction engagement mechanism 26 is supplied with its activating hydraulic fluid pressure Pd, when and only when the low/direct gear transmission mechanism 25 is providing its directly connected speed stage. With regard to the overall operation of the gear transmission mechanism 2, therefore, the hydraulic fluid pressure activated friction engagement mechanism 26 is supplied with its activating hydraulic fluid pressure Pd, when and only when either the gear transmission mechanism 2 is providing its highest speed stage or its overdrive speed stage, or when the gear transmission mechanism 2 is providing its next to highest speed stage or its directly connected speed stage; and in the former of these cases the activating hydraulic fluid pressure Pb is being also provided to the multi plate 21, while in the latter of these cases the activating hydraulic fluid pressure Pc is being also provided to the multi plate clutch 23.

THE HYDRAULIC FLUID PRESSURE CONTROL SYSTEM

The above mentioned hydraulic fluid pressure control system 27 is only shown by a block in the drawing, because such hydraulic fluid pressure control systems are already per se well known in various different forms. Further, the various elements of the hydraulic fluid pressure control system 27 are also only shown by blocks in the drawing, because these elements likewise are already per se well known in various different forms. Elements of the hydraulic fluid pressure control system 27 receive supply of pressurized hydraulic fluid, which is picked up from a hydraulic fluid reservoir 28 and is initially pressurized by a hydraulic fluid pump 29, via a line hydraulic fluid pressure control valve 30, which controls the pressure of this initially pressurized hydraulic fluid to a controlled line hydraulic fluid pressure Pl by releasing a part of this initially pressurized hydraulic fluid to a relief passage not shown in the FIGURE which leads back to said hydraulic fluid reservoir 28. Further, the hydraulic fluid pressure control system 27 comprises a torque converter hydraulic fluid pressure control valve 37, which receives supply of said hydraulic fluid which is being released from the line hydraulic fluid pressure control valve 30, said torque converter hydraulic fluid pressure control valve 37 controlling the pressure of this released hydraulic fluid to a controlled torque converter hydraulic fluid pressure Pq, which is of course lower than the above mentioned line hydraulic fluid pressure Pl. The hydraulic fluid pressure control system 27 may also control in a varying fashion the standard value Pl of the line hydraulic fluid pressure and the standard value Pq of the torque converter hydraulic fluid pressure, according to various different operational considerations of the transmission system and of the vehicle incorporating it, but this is not strictly relevant to the present invention.

Further, the hydraulic fluid pressure control system 27 comprises a throttle hydraulic fluid pressure control valve 32 of a per se well known sort, which produces a throttle hydraulic fluid pressure Pth by regulating the line hydraulic fluid pressure Pl produced by the line hydraulic fluid pressure control valve 30 according to the current amount of depression of a throttle pedal (not shown) of the vehicle incorporating this transmission system, and also comprises a governor hydraulic fluid pressure control valve 33, also of a per se well known sort, which similarly produces a governor hydraulic fluid pressure Pgo by regulating the line hydraulic fluid pressure Pl produced by the line hydraulic fluid pressure control valve 30 according to the current value of the road speed of the vehicle incorporating this transmission system. Yet further, the hydraulic fluid pressure control system 27, as mentioned above, selectively provides supplies of the line hydraulic fluid pressure Pl as actuating hydraulic fluid pressures such as Pb, Pc, and Pd to the various friction engaging mechanisms of the gear transmission mechanism 2, including the multi plate brake 21 and the multi plate clutch 23 of the overdrive mechanism 16, and the friction engaging mechanism 26 of the low/direct gear transmission mechanism 25, via hydraulic fluid conduits such as the hydraulic fluid conduits 92, 93, and 94 (the others of these friction engaging mechanisms and hydraulic fluid conduits not being shown), according to various different operational conditions of the vehicle incorporating this transmission, said operational conditions including the current range of transmission speeds such as "D" range and "L" range manually selected by the driver of the vehicle on a manual range selection valve 31 comprised in the hydraulic fluid pressure control system 27, and the current values of accelerator pedal depression and vehicle road speed. To this end, as is per se well known in the art, the hydraulic fluid pressure control system 27 switches said supplies Pb, Pc, Pd, etc. of the line hydraulic fluid pressure Pl according to the switching actions of a first/second switching valve 34, a second/third speed switching valve 35, and a third/fourth speed switching valve 36, each of said switching valves 34, 35, and 36 comprised in the hydraulic fluid pressure control system 27 being supplied with the above specified throttle hydraulic fluid pressure Pth and governor hydraulic fluid pressure Pgo in such a way that these hydraulic fluid pressures Pth and Pgo oppose one another in their effects thereon, and each of said switching valves 34, 35, and 36 being switched between its two switched states according to its own particular balance relationship between said throttle hydraulic fluid pressure Pth and said governor hydraulic fluid pressure Pgo. The hydraulic fluid pressure control system 27 also supplies a supply of the torque converter hydraulic fluid pressure Pq to the lock up clutch assembly, described above, of the torque converter 1, via a hydraulic fluid conduit 43, a lock up clutch control valve 38, and sometimes via a fail safe 39 which will be all hereinafter described in detail, so as to operate said lock up clutch assembly to be either engaged or disengaged, according to the switching positions of said lock up clutch control valve 38 and said fail safe valve 39. This function will be explained in detail later. Further, the hydraulic fluid pressure control system 27 supplies various hydraulic fluid pressures for controlling a first lock up clutch interrupt valve 60, a second lock up clutch interrupt valve 70, and said fail safe valve 39, and for being switched by said first lock up clutch interrupt valve 60, said second lock up clutch interrupt valve 70, and said fail safe valve 39, via hydraulic fluid conduits 63, 66, 69, 74, and 76, as will allo also be explained in detail later.

CONSTRUCTION OF THE LOCK UP CLUTCH CONTROL VALVE

Now the lock up clutch control valve 38 will be described. This lock up clutch control valve 38 comprises a valve housing in which there is formed a bore, and a valve spool member 40 which is slidingly fitted into said bore, so as to reciprocate in the upwards and downwards directions as seen in the drawing. Below said valve spool member 40 in said bore, there is also slidingly fitted within said bore a piston member 41, the upper end of which in the drawing contacts the lower end of the valve spool member 40. The upper end in the drawing of the valve spool member 40 is formed with an upper land portion 40a, and the lower end in the drawing of the valve spool member 40 is formed with a lower land portion 40b, the diameter of said lower land portion 40b and the diameter of the piston member 41 being substantially equal, and both these diameters being substantially larger than the diameter of the upper land portion 40a. Further, a compression coil spring 42 is provided above said valve spool member 40 in said bore of said lock up clutch control valve 38, so as to bias said valve spool member 40 and said piston member 41 in the downwards direction as seen in the drawing. The top end of said compression coil spring 42 bears on the top end of said bore. At the upper end of said bore of said lock up clutch control valve 38 as seen in the drawing, above said valve spool member 40, there is thus defined within said valve bore a first pressure chamber, to which a biasing port 52 communicates, the pressure within this first pressure chamber acting on the combination of the valve spool member 40 and the piston member 41 over an effective pressure receiving area defined by the diameter of the smaller upper land portion 40a, so as to bias them downwards as seen in the drawing; at the lower end of said valve bore as seen in the drawing, below said piston member 41, there is defined within said valve bore a second pressure chamber, to which a lower control port 54 communicates, the pressure within this second pressure chamber acting on the combination of the valve spool member 40 and the piston member 41 over an effective pressure receiving area defined by the diameter of the piston member 41 which is substantially equal to the diameter of the larger lower land portion 40b of the valve spool member 40, so as to bias them upwards as seen in the drawing; and, at an intermediate part of said bore of said lock up clutch control valve 38 as seen in the drawing, below said valve spool member 40 and above said piston member 41, there is defined within said valve bore a third pressure chamber, to which an intermediate control port 53 communicates, the pressure within this third pressure chamber acting on both the valve spool member 40 and the piston member 41 over effective pressure receiving areas defined substantially by the diameter of the larger lower land portion 40b of the valve spool member 40, so as to bias the valve spool member 40 upwards as seen in the drawing, and so as to bias the piston member 41 downwards as seen in the drawing. The valve spool member 40 and the piston member 41 can move either to downwardly biased positions within the valve bore of the lock up clutch control valve 38, as seen to the left of the central axis of said bore in the drawing, or to upwardly biased positions within said valve bore, as seen to the right of the central axis of said valve bore in the drawing.

OPERATION OF THE LOCK UP CLUTCH CONTROL VALVE

The line hydraulic fluid pressure Pl is always supplied to the biasing port 52 of the lock up clutch control valve 38, via a hydraulic fluid conduit 96, from the hydraulic fluid pressure control system 27, and thus to said first pressure chamber defined at the upper end of the valve bore of said lock up clutch control valve 38. Thus, when actuating hydraulic fluid pressure substantially equal to said line hydraulic fluid pressure Pl is also supplied, via a hydraulic fluid conduit 68 as will be explained later, from a port 67 of the first lock up clutch interrupt valve 60 via a hydraulic fluid conduit 68 to said lower control part 54 opening to said second pressure chamber defined at the bottom of said valve bore of the lock up clutch control valve 38, because of the above mentioned substantial difference between the diameter of the piston member 41 and the diameter of the upper land portion 40a of the valve spool member 40, the valve spool member 40 and the piston member 41 are both positively and definitely driven upwards as seen on the right of the central axis of the bore of the direct clutch control valve 38 in the drawing against the biasing action of the compression coil spring 42 which is overcome, and against the force due to said line hydraulic fluid pressure Pl which is as explained above always provided via the hydraulic fluid conduit 96 to the first pressure chamber defined at the top of said valve bore to which the biasing port 52 communicates; further, when actuating pressure substantially equal to said line hydraulic fluid pressure Pl is supplied, from a port 84 of the fail safe valve 39 and via a hydraulic fluid conduit 85 as will be explained later, to said third pressure chamber defined at the intermediate portion of said valve bore of this lock up clutch control valve 38 to which the intermediate control port 53 communicates, because of the above mentioned substantial difference in the diameters of the lower land portion 40b of the valve spool member 40 and of the upper land portion 40a thereof, the valve spool member 40 is again positively and definitely driven upwards as seen on the right of the central axis of the bore of the direct clutch control valve 38 in the drawing against the biasing action of the compression coil spring 42 which is overcome, and against the force due to said line hydraulic fluid pressure Pl which is as explained above always provided to the first pressure chamber defined at the top of said valve bore to which the biasing port 52 communicates, while the piston member 41 is driven downwards as seen on the left of the axis of the valve bore in the drawing; but, on the other hand, when no actuating pressure substantially equal to said line hydraulic fluid pressure Pl is supplied either to the second pressure chamber defined at the bottom of said valve bore in the drawing to which the lower control port 54 communicates or to the third pressure chamber defined at said intermediate portion thereof to which the intermediate control port 53 communicates, then the valve spool member 40 and the piston member 41 are both driven downwards as seen on the left of the valve bore in the drawing by the line hydraulic fluid pressure Pl always supplied to the first pressure chamber defined at the top of said valve bore to which the biasing port 52 communicates, with the aid of the biasing action of the compression coil spring 42. Thus, it will be seen that sticking of the valve spool member 40 and the piston member 41 of the lock up clutch control valve 38 in either of their switched positions is strongly guarded against, because the action of the compression coil spring 42 is not particularly relied upon for biasing said valve spool member 40 and said piston member 41; and it will be seen that said valve spool member 40 and said piston member 41 are moved between their upwardly biased positions and their downwardly biased positions within the valve bore of said lock up clutch control valve 38, according as to whether line hydraulic fluid pressure is or is not supplied either to said second pressure chamber defined at the lower end of said valve bore to which said lower control port 54 communicates or to said third pressure chamber defined at the intermediate portion of said valve bore to which said intermediate control port 53 communicates. This particular inventive concept relating to the biasing of the lock up clutch control valve not merely by a spring but by a biasing pressure supplied to a biasing port is not the invention of the present application.

The lock up clutch control valve 38 is provided with six switched ports 45, 46, 49, 50, 55, and 56. When the valve spool member 40 is in its downwardly biased position within the valve bore as seen on the left of the central axis of the valve bore in the drawing, then the ports 55 and 56 are not connected to any other ports, while the ports 45 and 46 are communicated to one another, and the ports 49 and 50 are also communicated to one another. On the other hand, when the valve spool member 40 is in its upwardly biased position within the valve bore of the lock up clutch control valve 38 as seen on the right of the central axis of the valve bore in the drawing, then the port 45 and the port 50 are not connected to any other ports, while the ports 46 and 56 are communicated to one another, and the ports 49 and 55 are also communicated to one another.

CONNECTIONS OF THE LOCK UP CLUTCH CONTROL VALVE

These switching ports of the lock up clutch control valve 38 are connected as follows. The lower control port 54 is connected, via a hydraulic fluid conduit 68, ports 67 and 65 of a first lock up clutch interrupt valve 60 which will be explained later, and a hydraulic fluid conduit 66, to the hydraulic fluid pressure control system 27, for selectively receiving supply of switching hydraulic fluid pressure Pb for switching the lock up control valve 38, as will be explained in detail in what follows with respect to the operation of this preferred embodiment of the automatic transmission lock up clutch control system according to the present invention. The biasing port 52 is connected, via the above mentioned hydraulic fluid conduit 96, to the hydraulic fluid pressure control system 27, for always receiving biasing supply of line hydraulic fluid pressure Pl, as explained above. The intermediate control port 53 is connected, via a hydraulic fluid conduit 85, to a port 84 of the fail safe valve 39 which will be explained in detail later. The port 45 is connected via a one way valve 44 and a hydraulic fluid conduit 43 to the hydraulic fluid pressure control system 27, for always receiving supply of the torque converter hydraulic fluid pressure Pq. The port 46 is connected via a hydraulic fluid conduit 47 to the second hydraulic fluid aperture 13, already mentioned, which leads to the interior space 15 within the torque converter housing 4 which lies between the end wall 4a of the torque converter housing 4 and the clutch plate 3 in the FIGURE, to the left of the clutch plate 13. The port 49 is connected via a hydraulic fluid conduit 48 to the first hydraulic fluid aperture 12, already mentioned, which leads to the interior space 14 within the torque converter housing 4 which lies to the right of the clutch plate 3 in the FIGURE. The port 50 is connected, via a hydraulic fluid control 51, to the input side of a hydraulic fluid cooler, comprised in the hydraulic fluid pressure control system 27 but not particularly shown in the drawing, the output side of which is drained to the hydraulic fluid reservoir 28. Further, this hydraulic fluid conduit 51 is also communicated, via a restricted orifice 98, to the port 49 of the lock up clutch control valve 38. The port 55 is connected, via a hydraulic fluid conduit 89, to a port 88 of the fail safe valve 39. And the port 56 is connected, via a hydraulic fluid conduit 57, to another port 58 of the fail safe valve 39.

FUNCTION OF THE LOCK UP CLUTCH CONTROL VALVE

First, the case will be explained in which the valve spool member 40 of the lock up clutch control valve 38 is in its downwardly biased position within the valve bore thereof, as seen to the left of the central axis of this valve bore in the drawing. It will shortly be seen that in this case, definitely, the lock up clutch assembly of the torque converter 1 will be activated to be in its disengaged operational condition.

In this case, no actuating supply of hydraulic fluid pressure is being supplied from the first lock up clutch interrupt valve 60 via the hydraulic fluid conduit 68 to the lower control port 54 of the lock up clutch control valve 38 or to the second pressure chamber defined at the bottom of the valve bore thereof to which said lower control port 54 opens, and no actuating supply of hydraulic fluid pressure is being supplied from the port 84 of the fail safe valve 39 via the hydraulic fluid conduit 85 and via the intermediate control port 53 of the lock up clutch control valve 38 to the third pressure chamber defined at the intermediate portion of the valve bore thereof to which said intermediate control port 53 opens; and thus, because the hydraulic fluid pressure control system 27 still of course is sending supply of the line hydraulic fluid pressure P1 to the biasing port 52 of the lock up clutch control valve 38, accordingly by the biasing actions of the compression coil spring 42 and of the pressure of this line hydraulic fluid pressure P1, the valve spool member 40 of the lock up clutch control valve 38 and the piston member 41 thereof are both shifted downwards as seen in the drawing to their positions as seen on the left of the central axis of the valve bore in the drawing. In this state, the hydraulic fluid pressure control system 27 supplies the torque converter hydraulic fluid pressure Pq via the hydraulic fluid conduit 43 and the one way valve 44 to the port 45 of the lock up clutch control valve 38, whence this pressure is transmitted to the port 46 thereof, whence it is transmitted, via the hydraulic fluid conduit 47, to the second hydraulic fluid aperture 13 of the torque converter housing 4. Hydraulic fluid therefore passes in through this second hydraulic fluid aperture 13 to the space 15 inside of the torque converter housing 4 to the left in the drawing of the lock up clutch plate 3, between the lock up clutch plate 3 and the end wall 4a of the torque converter housing 4, fills the inside of the torque converter housing 4 as is of course required, flows past the outer edge of the lock up clutch plate 3, between the lining 91 mounted on this outer edge and the end wall 4a of the torque converter housing 4, to the space 14 inside the torque converter housing 4 to the right in the drawing of the lock up clutch plate 3, and is taken out from the first hydraulic fluid aperture 12 from this space 14 inside of the torque converter housing 4 to the right in the drawing of the lock up clutch plate 3. From this first hydraulic fluid aperture 12, said hydraulic fluid flow is passed through the conduit 48 to the port 49 of the lock up clutch control valve 38, whence it is communicated to the port 50 thereof, whence it is drained to the hydraulic fluid reservoir 28 via the hydraulic fluid conduit 51 and the hydraulic fluid cooler, not shown.

This flow of hydraulic fluid, as explained above, causes an excess of hydraulic fluid pressure on the left side in the figure of the clutch plate 3 over the hydraulic fluid pressure on the right side thereof, due to the rather restricted size of the space available for passage of hydraulic fluid past the lining 91, between said lining 91 and the end wall 4a of the torque converter housing 5, and this pressure difference ensures that the clutch plate 3 as a whole is biased to the right in the figure, and is pressed away from the end wall 4a of the torque converter housing 4, and does not rotationally engage said end wall 4a via the lining 91, thus causing the clutch plate 3 and the torque converter housing 4 not to be mechanically rotationally coupled together. Accordingly the pump impeller 6 and the turbine member 7 of the torque converter 1 are not mechanically coupled together with regard to their rotation, but are only rotationally coupled together via the circulation of hydraulic fluid within the torque converter 1, i.e. are only rotationally coupled together in a torque converting fashion, according to the normal per se well known functioning of the torque converter 1. In other words, the lock up clutch assembly is disengaged, by the supply of hydraulic fluid into the interior of the torque converter housing 4 in through the second hydraulic fluid aperture 13, and the taking of hydraulic fluid out of the interior of the torque converter housing 4 from the first hydraulic fluid aperture 12.

In this state, the port 49 of the lock up clutch control valve 38 is communicated to the port 50, and flow of hydraulic fluid from the inside of the torque converter 1 is therefore passed through the hydraulic fluid cooler incorporated in the hydraulic fluid pressure control system 27. At this time, since the lock up clutch assembly is disengaged, only the circulation of hydraulic fluid within the torque converter 1 is operating to rotationally couple together the pump impeller 6 and the turbine member 7, as explained above, and accordingly the body of hydraulic fluid within the housing 4 of the torque converter 1 is being substantially churned by the pump impeller 6, the turbine member 7, and the stator member 8, all these members being in rotation at somewhat different rotational speeds, and accordingly considerable heat is being generated within the torque converter 1 by this churning of hydraulic fluid therein, because considerable frictional loss is occuring in the torque converter 1, the actual amount of heat which is being generated of course being related to the actual rotational speed of the power input shaft 5 and the actual rotational speed of the power output shaft 11 of the torque converter 1, as well as to the load being transmitted therebetween. Therefore, a considerable cooling effect may well be necessary from the hydraulic fluid cooler at this time.

Now, the case will be considered in which the valve spool member 40 of the lock up clutch control valve 38 is in its upwardly biased position within the valve bore thereof, as seen to the right of the central axis of this valve bore in the drawing. It will be seen that in this case the lock up clutch assembly may be activated to be either in its engaged or its disengaged operational condition, according to the position of the valve spool member 82 of the fail safe valve 39; and this will be explained in more detail later.

In this case, either an actuating supply of hydraulic fluid pressure Pb of pressure magnitude substantially equal to the line hydraulic fluid pressure P1 is being supplied from the first lock up clutch interrupt valve 60 via the hydraulic fluid conduit 68, as will be explained later, to the lower control port 54 of the lock up clutch control valve 38, this hydraulic fluid pressure present within the second pressure chamber defined at the bottom of the valve bore of said lock up clutch control valve 38 driving the valve spool member 40 and the piston member 41 of the lock up clutch control valve 38 upwards as seen in the drawing to their positions as seen on the right of the central axis of the valve bore in the drawing against the biasing actions of the compression force of the compression coil spring 42 and of the line hydraulic fluid pressure P1 which is present within the first pressure chamber at the top of the bore of the lock up clutch control valve 38 which are overcome; or, alternatively, an actuating supply of hydraulic fluid pressure of pressure magnitude substantially equal to the line hydraulic fluid pressure P1 is being supplied from the fail safe valve 39 via the hydraulic fluid conduit 85, as also will be explained later, to the intermediate control port 53 of the lock up clutch control valve 38, this hydraulic fluid pressure present within the third pressure chamber defined at the intermediate portion of the valve bore of said lock up clutch control valve 38 driving the valve spool member 40 of the lock up clutch control valve 38 upwards as seen in the drawing to its position as seen on the right of the central axis of the valve bore in the drawing against the biasing actions of the compression force of the compression coil spring 42 and of the line hydraulic fluid pressure P1 which is present within the first pressure chamber at the top of the bore of the lock up clutch control valve 38 which are overcome, while driving the piston member 41 downwards as seen in the drawing to its position as seen on the left of the central axis of the valve bore in the drawing. In either case, given that the valve spool member 40 of the lock up clutch control valve 38 is in its upwardly biased position within the valve bore thereof, the port 56 of the lock up clutch control valve 38 is communicated to the port 46 thereof and thence via the hydraulic fluid conduit 47 is communicated to the second hydraulic fluid aperture 13 of the torque converter housing 4. Further, the port 55 of the lock up clutch control valve 38 is communicated to the port 49 thereof and thence via the hydraulic fluid conduit 48 is communicated to the first hydraulic fluid aperture 12 of the torque converter housing 4.

The port 56 of the lock up clutch control valve 38 is connected via the hydraulic fluid conduit 57 to the port 58 of the fail safe valve 39, and the port 55 of the lock up clutch control valve 38 is connected via the hydraulic fluid conduit 89 to the port 88 of the fail safe valve 39. As will be explained later with respect to the functioning of the fail safe valve 39, as the valve spool member 82 of this fail safe valve 39 moves between its upper and its lower positions within the bore thereof, respectively either the torque converter hydraulic fluid pressure Pq is supplied to the port 58 thereof from the port 86 thereof and the port 88 thereof is drained via the drain port 90 thereof, or the torque converter hydraulic fluid pressure Pq is supplied to the port 88 thereof from the port 87 thereof and the port 58 thereof is drained via the drain port 59 thereof.

Thus, according as the valve spool member 82 of this fail safe valve 39 moves between its upper and its lower positions within the bore thereof, either: (a) the hydraulic fluid pressure control system 27 supplies the torque converter hydraulic fluid pressure Pq to the port 56 of the lock up clutch control valve 38, whence this pressure is transmitted to the port 46 thereof, whence it is transmitted as in the previous case, via the hydraulic fluid conduit 47, to the second hydraulic fluid aperture 13 of the torque converter housing 4, from which said hydraulic fluid passes in through this second hydraulic fluid aperture 13 to the space 15 inside of the torque converter housing 4 to the left in the drawing of the lock up clutch plate 3, between the lock up clutch plate 3 and the end wall 4a of the torque converter housing 4, fills the inside of the torque converter housing 4 as is of course required, flows past the outer edge of the lock up clutch plate 3, between the lining 91 mounted on this outer edge and the end wall 4a of the torque converter housing 4, to the space 14 inside the torque converter housing 4 to the right in the drawing of the lock up clutch plate 3, and is taken out from the first hydraulic fluid aperture 12 from this space 14 inside of the torque converter housing 4 to the right in the drawing of the lock up clutch plate 3, passes through the conduit 48 to the port 49 of the lock up clutch control valve 38, whence it is communicated to the port 55 thereof, whence it is drained to the hydraulic fluid reservoir 28 via the hydraulic fluid conduit 89 and the ports 88 and 90 of the fail safe valve 39; or (b) the hydraulic fluid pressure control system 27 supplies the torque converter hydraulic fluid pressure Pq to the port 55 of the lock up clutch control valve 38, whence this pressure is transmitted to the port 49 thereof, whence it is transmitted via the hydraulic fluid conduit 48 to the first hydraulic fluid aperture 12 of the torque converter housing 4, from which said hydraulic fluid passes in through this first hydraulic fluid aperture 12 to the space 14 inside of the torque converter housing 4 to the right in the drawing of the lock up clutch plate 3, fills the inside of the torque converter housing 4 as is of course required, flows past the outer edge of the lock up clutch plate 3, between the lining 91 mounted on this outer edge and the end wall 4a of the torque converter housing 4, to the space 15 inside the torque converter housing 4 to the left in the drawing of the lock up clutch plate 3, between the lock up clutch plate 3 and the end wall 4a of the torque converter housing 4, and is taken out from the second hydraulic fluid aperture 13 from this space 15 inside of the torque converter housing 4 to the left in the drawing of the lock up clutch plate 3, passes through the conduit 47 to the port 46 of the lock up clutch control valve 38, whence it is communicated to the port 56 thereof, whence it is drained to the hydraulic fluid reservoir 28 via the hydraulic fluid conduit 57 and the ports 58 and 59 of the fail safe valve 39.

In case (a), as before, the flow of hydraulic fluid causes an excess of hydraulic fluid pressure on the left side in the figure of the clutch plate 3 over the hydraulic fluid pressure on the right side thereof, due to the rather restricted size of the space available for passage of hydraulic fluid past the lining 91, between said lining 91 and the end wall 4a of the torque converter housing 5, and this pressure difference ensures that the clutch plate 3 as a whole is biased to the right in the figure, and is pressed away from the end wall 4a of the torque converter housing 4, and does not rotationally engage said end wall 4a via the lining 91, thus causing the clutch plate 3 and the torque converter housing 4 not to be mechanically rotationally coupled together. Accordingly the pump impeller 6 and the turbine member 7 of the torque converter 1 are not mechanically coupled together with regard to their rotation, but are only rotationally coupled together via the circulation of hydraulic fluid within the torque converter 1, i.e. are only rotationally coupled together in a torque converting fashion, according to the normal per se well known functioning of the torque converter 1. In other words, the lock up clutch assembly is disengaged, by the supply of hydraulic fluid into the interior of the torque converter housing 4 in through the second hydraulic fluid aperture 13, and the taking of hydraulic fluid out of the interior of the torque converter housing 4 from the first hydraulic fluid aperture 12.

On the other hand, in case (b) above, the flow of hydraulic fluid causes an excess of fluid pressure on the right side in the figure of the clutch plate 3 over the fluid pressure on the left side thereof, due to the rather restricted size of the space available for passage of hydraulic fluid past the lining 91, between said lining 91 and the end wall 4a of the torque converter housing 4, and this pressure difference ensures that the clutch plate 3 as a whole is biased to the left in the figure, and is pressed tightly against the end wall 4a of the torque converter housing 4, via the lining 91, thus causing the clutch plate 3 and the torque converter housing 4 to be mechanically rotationally coupled together. Accordingly the power input shaft 5 and the power output shaft 9 of the torque converter 1 are now mechanically coupled together with regard to their rotation, and the lock up clutch assembly is engaged, by the supply of hydraulic fluid into the interior of the torque converter housing 4 in through the first hydraulic fluid aperture 12, and the taking of hydraulic fluid out of the interior of the torque converter housing 4 from the second hydraulic fluid aperture 13.

In either of the above cases (a) and (b), in this state of controlling of the lock up clutch assembly by the fail safe valve 39, the port 50 of the lock up clutch control valve 38 is closed by the land portion 40b of the valve spool member 40, and is not connected to any other port, and hence only a small flow of hydraulic fluid is passed through the hydraulic fluid cooler incorporated in the hydraulic fluid pressure control system 27, said small flow passing through the restricted orifice 98 from the hydraulic fluid conduit 48. However, at this time, since as will be explained later in fact the case (a) does not occur during usual running of the vehicle in the overdrive speed stage, except in the event of sticking of the lock up clutch control valve 38 or of the first lock up clutch interrupt valve 60—in other words, the case (a) is chiefly an emergency condition—therefore generally at this time the lock up clutch assembly is engaged, and therefore the circulation of hydraulic fluid within the torque converter 1 has ceased, and the body of fluid within the housing 4 of the torque converter 1 is rotating as a unit together with the housing 4, the pump impeller 6, the turbine member 7, and the stator 8, all these being in rotation at substantially the same rotational speed, and accordingly very little heat is being generated within the torque converter 1 by the churning of hydraulic fluid therein, because little frictional loss is occuring in the torque converter 1. Therefore, only a slight cooling effect is generally necessary to be provided by the hydraulic fluid cooler at this time. However, in order to provide some cooling in the case (a) for the hydraulic fluid within the transmission, the orifice 98 is provided, as explained above.

CONSTRUCTION OF THE FIRST LOCK UP CLUTCH INTERRUPT VALVE

Now, the construction of the first lock up clutch interrupt valve 60 will be explained. This first lock up clutch interrupt valve 60 comprises a valve housing in which there is formed a bore, and a valve spool member 61 which is slidingly fitted into said bore, so as to reciprocate in the upwards and downwards directions as seen in the drawing. A compression coil spring 62 is provided below said valve spool member 61 in said bore, so as to bias said valve spool member 61 upwards as seen in the drawing, and so as to bear on the lower end of said bore of said first lock up clutch interrupt valve 60. At the upper end of said bore as seen in the drawing, above said valve spool member 61, there is thus defined within said valve bore a pressure chamber to which a control port 64 communicates, the pressure within this pressure chamber acting on the valve spool member 61 so as to bias said valve spool member 61 downwards as seen in the drawing within said valve bore, against the compression action of the compression coil spring 62. The valve spool member 61 can move either to a downwardly biased position within said valve bore of said first lock up clutch interrupt valve 60, as seen to the right of the central axis of the bore of the first lock up clutch interrupt valve 60 in the drawing, or to a upwardly biased position within said valve bore, as seen to the left of the central axis of the valve bore in the drawing.

OPERATION OF THE FIRST LOCK UP CLUTCH INTERRUPT VALVE

The governor hydraulic fluid pressure Pgo produced by the governor hydraulic fluid pressure control valve 33 is always supplied, via a hydraulic fluid conduit 63, from the hydraulic fluid pressure control system 27 to the control port 64 of the first lock up clutch interrupt valve 60, and thus to said pressure chamber defined at the upper end of the valve bore thereof. Thus, the force due to this governor hydraulic fluid pressure Pgo acts upon the valve spool member 61 of the first lock up clutch interrupt valve 60 so as to bias said valve spool member 61 downwards in the drawing, against the biasing action of the compression coil spring 62 which opposes said force due to said governor hydraulic fluid pressure Pgo, and thus said valve spool member 61 is moved upwards or downwards in the drawing, according to a balance relationship between the force due to said governor hydraulic fluid pressure Pgo and the compression action of said compression coil spring 62; in more detail, when the force due to said governor hydraulic fluid pressure Pgo prevails over the force due to said compression coil spring 62, which will occur when the road speed of the vehicle incorporating this transmission system is higher than a certain first predetermined road speed, then said valve spool member 61 is shifted to its downward shifted position as seen to the right of the central axis of the valve bore of the first lock up clutch interrupt valve 60 in the drawing; and, when the force due to the compression of said compression coil spring 62 prevails over the force due to said governor hydraulic fluid pressure Pgo, which will occur when the road speed of the vehicle incorporating this transmission system is lower than said certain first predetermined road speed, then said valve spool member 61 is shifted to its upward shifted position as seen to the left of the central axis of the valve bore of the first lock up clutch interrupt valve 60 in the drawing.

CONNECTIONS OF THE FIRST LOCK UP CLUTCH INTERRUPT VALVE

The first lock up clutch interrupt valve 60 is provided with three switched ports 99, 65, and 67. The port 99 is a drain port; the port 67 is connected to the hydraulic fluid conduit 68 which, as explained above, leads to the lower control port 54 of the lock up clutch control valve 38; and the port 65 is connected, via a hydraulic fluid conduit 66, to the hydraulic fluid pressure control system 27, and is supplied with the hydraulic fluid pressure Pb, which is produced as explained above by the hydraulic fluid pressure control system 27 for engaging the multi plate brake 21 of the overdrive mechanism 16 when and only when the gear transmission mechanism 2 as a whole is to be controlled to be in its highest speed stage or the overdrive speed stage, and which when so produced is of a pressure magnitude substantially equal to the line hydraulic fluid pressure P1. When the valve spool member 61 of the first lock up clutch interrupt valve 60 is in its upwardly biased position within the valve bore thereof as seen to the left of the valve bore of said lock up clutch interrupt valve 60 in the drawing, then the port 65 is not communicated to any other port, while the port 67 is communicated to the drain port 99. On the other hand, when the valve spool member 61 of the lock up clutch interrupt valve 60 is in its downwardly biased position within the valve bore thereof as seen to the right of said valve bore in the drawing, then the drain port 99 is not communicated to any other port, while the port 67 is communicated to the port 65.

FUNCTION OF THE FIRST LOCK UP CLUTCH INTERRUPT VALVE

The first lock up clutch interrupt valve described above operates as follows.

When the road speed of the vehicle incorporating this transmission system is higher than said certain first predetermined road speed, then said valve spool member 61 is shifted to its downward shifted position as seen to the right of the central axis of the valve bore of the first lock up clutch interrupt valve 60 in the drawing by the force due to the governor hydraulic fluid pressure Pgo which prevails over the compression force of the compression coil spring 62; and, if and only if at this time the hydraulic fluid pressure Pb is being produced as explained above by the hydraulic fluid pressure control system 27 for engaging the multi plate brake 21 of the overdrive mechanism 16, i.e. if and only if the gear transmission mechanism 2 as a whole is being controlled to be in its highest speed stage or its overdrive speed stage, then said hydraulic fluid pressure Pb, of magnitude substantially equal to the line hydraulic fluid pressure P1, is present at the port 67 of the first lock up clutch interrupt valve 60 and is supplied via the hydraulic fluid conduit 68 to the lower control port 54 of the lock up clutch control valve 38; in all other cases—i.e. when the gear transmission mechanism 2 as a whole is being controlled to be in any speed stage other than its highest speed stage or its overdrive speed stage, or when even though the gear transmission mechanism 2 as a whole is being controlled to be in its highest speed stage or its overdrive speed stage nevertheless the road speed of the vehicle incorporating this transmission system is lower than said certain first predetermined road speed, in which case the force due to the compression of said compression coil spring 62 will prevail over the force due to said governor hydraulic fluid pressure Pgo and will shift said valve spool member 61 to its upward shifted position as seen to the left of the central axis of the valve bore of the first lock up clutch interrupt valve 60 in the drawing—no substantial hydraulic fluid pressure is present at the port 67 of the first lock up clutch interrupt valve 60 or is supplied via the hydraulic fluid conduit 68 to the lower control port 54 of the lock up clutch control valve 38. In other words, the presence of hydraulic fluid pressure at the lower control port 54 of the lock up clutch control valve 38 indicates high vehicle speed operation in the overdrive speed stage.

CONSTRUCTION OF THE SECOND LOCK UP CLUTCH INTERRUPT VALVE

Now, the construction of the second lock up clutch interrupt valve 70 will be explained. This second lock up clutch interrupt valve 70 comprises a valve housing in which there is formed a bore, and a valve spool member 72 which is slidingly fitted into said bore, so as to reciprocate in the upwards and downwards directions as seen in the drawing. A compression coil spring 73 is provided above said valve spool member 72 in said bore, so as to bias said valve spool member 72 downwards as seen in the drawing, and so as to bear on the upper end of said bore of said second lock up clutch interrupt valve 70. At the upper end of said bore as seen in the drawing, above said valve spool member 72, there is defined within said valve bore a pressure chamber to which a control port 77 communicates, the pressure within this pressure chamber acting on the valve spool member 72 so as to bias said valve spool member 72 downwards as seen in the drawing within said valve bore, so as to aid the compression action of the compression coil spring 73; and at the lower end of said bore as seen in the drawing, below said valve spool member 72, there is defined within said valve bore another pressure chamber to which a control port 75 communicates, the pressure within this other pressure chamber acting on the valve spool member 72 so as to bias said valve spool member 72 upwards as seen in the drawing within said valve bore, against the compression action of the compression coil spring 73; and against the force of any pressure present in said chamber at the top of said valve bore to which said control port 77 communicates. The valve spool member 72 can move either to a downwardly biased position within said valve bore of said second lock up clutch interrupt valve 70, as seen to the left of the central axis of the bore of the second lock up clutch interrupt valve 70 in the drawing, or to a upwardly biased position within said valve bore, as seen to the right of the central axis of the valve bore in the drawing.

OPERATION OF THE SECOND LOCK UP CLUTCH INTERRUPT VALVE

The throttle hydraulic fluid pressure Pth produced by the throttle hydraulic fluid pressure control valve 32 is always supplied, via a hydraulic fluid conduit 76, from the hydraulic fluid pressure control system 27 to the control port 77 of the second lock up clutch interrupt valve 70, and thus to said pressure chamber defined at the upper end in the drawing of the valve bore thereof. Thus, the force due to this throttle hydraulic fluid pressure Pth, of a magnitude proportional to the magnitude of said throttle hydraulic fluid pressure Pth, acts upon the valve spool member 61 of the second lock up clutch interrupt valve 70 so as to bias said valve spool member 61 downwards in the drawing, thus aiding the biasing action of the compression coil spring 73. On the other hand, the hydraulic fluid pressure Pd—which is produced, as explained above, for activating the hydraulic fluid pressure activated friction engagement mechanism 26, when and only when the low-/direct gear transmission mechanism 25 is providing its directly connected speed stage, i.e. when and only when either the gear transmission mechanism 2 is providing its highest speed stage or its overdrive speed stage, or when the gear transmission mechanism 2 is providing its next to highest speed stage or its directly connected speed stage—is supplied to said pressure chamber defined at the lower end of said bore of said second lock up clutch interrupt valve 70 as seen in the drawing, below said valve spool member 72 thereof, to which said control port 75 communicates; and therefore said hydraulic fluid pressure Pd, when present and of magnitude substantially equal to said line hydraulic fluid pressure P1, opposes (in terms of action on said valve spool member 72 of said second lock up clutch interrupt valve 70) said force which is the combination of the spring force of the compression coil spring 73 and the pressure force due to said throttle hydraulic fluid pressure Pth. Thus, in these circumstances, said valve spool member 72 is moved upwards or downwards in the drawing, according to a balance relationship between said force which is the combination of the spring force of the compression coil spring 73 and the variable pressure force due to said throttle hydraulic fluid pressure Pth which of course varies according to variation of the throttle opening of the throttle of the vehicle, and said force due to said hydraulic fluid pressure Pd, which when present is a constant force.

In more detail, when said force which is the combination of the spring force of the compression coil spring 73 and the variable pressure force due to said throttle hydraulic fluid pressure Pth prevails over said constant force due to said hydraulic fluid pressure Pd, which will occur when the throttle opening of said throttle of the vehicle incorporating this transmission system is greater than a certain predetermined throttle opening, then said valve spool member 72 is shifted to its downward shifted position as seen to the left of the central axis of the valve bore of the second lock up clutch interrupt valve 70 in the drawing; but, on the other hand, when said constant force due to said hydraulic fluid pressure Pd prevails over said force which is the combination of the spring force of the compression coil spring 73 and the variable pressure force due to said throttle hydraulic fluid pressure Pth, which will occur when when the throttle opening of said throttle of the vehicle incorporating this transmission system is less than said certain predetermined throttle opening, then said valve spool member 72 is shifted to its upward shifted position as seen to the right of the central axis of the valve bore of the second lock up clutch interrupt valve 70 in the drawing.

CONNECTIONS OF THE SECOND LOCK UP CLUTCH INTERRUPT VALVE

The second lock up clutch interrupt valve 70 is provided with three switched ports 97, 71, and 78. The port 97 is a drain port; the port 78 is connected to a hydraulic fluid conduit 79 which leads to a port 80 of the fail safe valve 39; and the port 71 is connected, via a hydraulic fluid conduit 69, to the hydraulic fluid pressure control system 27, and is supplied with the hydraulic fluid pressure Pc, which is produced as explained above by the hydraulic fluid pressure control system 27 for engaging the multi plate clutch 23 of the overdrive mechanism 16 when and only when the gear transmission mechanism 2 as a whole is to be controlled not to be in its highest speed stage or the overdrive speed stage, and which when so produced is of a pressure magnitude substantially equal to the line hydraulic fluid pressure P1.

When the valve spool member 72 of the second lock up clutch interrupt valve 70 is in its downwardly biased position within the valve bore thereof as seen to the left of the valve bore of said lock up clutch interrupt valve 70 in the drawing, then the port 71 is not communicated to any other port, while the port 78 is communicated to the drain port 97. On the other hand, when the valve spool member 72 of the lock up clutch interrupt valve 70 is in its upwardly biased position within the valve bore thereof as seen to the right of said valve bore in the drawing, then the drain port 97 is not communicated to any other port, while the port 78 is communicated to the port 71.

FUNCTION OF THE SECOND LOCK UP CLUTCH INTERRUPT VALVE

The second lock up clutch interrupt valve described above operates as follows.

When the hydraulic fluid pressure Pd is being produced, as explained above, i.e. when and only when the low/direct gear transmission mechanism 25 is providing its directly connected speed stage (which is when and only when the gear transmission mechanism 2 is providing either its highest speed stage or its directly connected speed stage), and when the throttle opening of the throttle of the vehicle incorporating this transmission system is lower than said certain predetermined throttle opening, then and only then is said valve spool member 72 shifted to its upward shifted position as seen to the right of the central axis of the valve bore of the second lock up clutch interrupt valve 70 in the drawing by said force of constant magnitude due to said hydraulic fluid pressure Pd prevailing over said force which is the combination of the spring force of the compression coil spring 73 and the variable pressure force due to said throttle hydraulic fluid pressure Pth; in all other cases, said valve spool member 72 is shifted to its downward shifted position as seen to the left of the central axis of the valve bore of the second lock up clutch interrupt valve 70 in the drawing. When said valve spool member 72 is thus shifted to its upward shifted position as seen to the right of the central axis of the valve bore, if and only if at this time the hydraulic fluid pressure Pc is being produced as explained above by the hydraulic fluid pressure control system 27 for engaging the multi plate clutch 23 of the overdrive mechanism 16, i.e. if and only if the gear transmission mechanism 2 as a whole is being controlled not to be in its highest speed stage or the overdrive speed stage, then said hydraulic fluid pressure Pc, of magnitude substantially equal to the line hydraulic fluid pressure P1, is present at the port 78 of the second lock up clutch interrupt valve 70 and is supplied via the hydraulic fluid conduit 79 to the port 80 of the fail safe valve 39; in all other cases—i.e. when the gear transmission mechanism 2 as a whole is being controlled to be in any speed stage other than its next to highest speed stage or its directly connected speed stage, or when even though the gear transmission mechanism 2 as a whole is being controlled to be in its next to highest speed stage or its directly connected speed stage nevertheless the throttle opening of the throttle of the vehicle incorporating this transmission system is greater than said certain predetermined throttle opening, in which case the force due to the combination of the spring force of the compression coil spring 73 and the variable pressure force due to said throttle hydraulic fluid pressure Pth will prevail over the constant force due to said hydraulic fluid pressure Pd and will shift said valve spool member 61 to its downward shifted position as seen to the left of the central axis of the valve bore of the second lock up clutch interrupt valve 70 in the drawing—no substantial hydraulic fluid pressure is present at the port 78 of the second lock up clutch interrupt valve 70 or is supplied via the hydraulic fluid conduit 79 to the port 80 of the fail safe valve 39. In other words, in the shown preferred embodiment, the presence of hydraulic fluid pressure at the port 80 of the fail safe valve 39 indicates fairly low vehicle throttle opening in the third speed stage.

CONSTRUCTION OF THE FAIL SAFE VALVE

Now the fail safe valve 39 will be described. This fail safe valve 39 comprises a valve housing in which there is formed a bore, and a valve spool member 82 which is slidingly fitted into said bore, so as to reciprocate in the upwards and downwards directions as seen in the drawing. Below said valve spool member 82 in said bore, a compression coil spring 81 is provided in said bore of said fail safe valve 39, so as to bias said valve spool member 82 in the upwards direction as seen in the drawing. The bottom end of said compression coil spring 81 bears on the bottom end of said bore. At the upper end of said bore of said fail safe valve 39 as seen in the drawing, above said valve spool member 82, there is thus defined within said valve bore a pressure chamber, to which a control port 83 communicates, the pressure within this pressure chamber acting on the valve spool member 82 so as to bias it downwards as seen in the drawing, against the compression action of said compression coil spring 81. The valve spool member 82 can move either to a downwardly biased position within the valve bore of the lock up clutch control valve 38, as seen to the right of the central axis of said bore in the drawing, or to an upwardly biased position within said valve bore, as seen to the left of the central axis of said valve bore in the drawing.

OPERATION OF THE FAIL SAFE VALVE

The governor hydraulic fluid pressure Pgo produced by the governor hydraulic fluid pressure control valve 33 is always supplied, via a hydraulic fluid conduit 95 and the aforementioned hydraulic fluid conduit 63 and via the control port 64 of the first lock up clutch interrupt valve 60, from the hydraulic fluid pressure control system 27 to the control port 83 of the fail safe valve 39, and thus to said pressure chamber defined at the upper end of the valve bore thereof. Thus, the force due to this governor hydraulic fluid pressure Pgo acts upon the valve spool member 82 of the fail safe valve 39 so as to bias said valve spool member 82 downwards in the drawing, against the biasing action of the compression coil spring 81 which opposes said force due to the governor hydraulic fluid pressure Pgo, and thus said valve spool member 82 is moved upwards or downwards in the drawing, according to a balance relationship between the force due to said governor hydraulic fluid pressure Pgo and the compression action of said compression coil spring 81; in more detail, when the force due to said governor hydraulic fluid pressure Pgo prevails over the force due to said compression coil spring 81, which will occur when the road speed of the vehicle incorporating this transmission system is higher than a certain second predetermined road speed, then said valve spool member 82 is shifted to its downward shifted position as seen to the right of the central axis of the valve bore of the fail safe valve 39 in the drawing; and, when the force due to the compression of said compression coil spring 82 prevails over the force due to said governor hydraulic fluid pressure Pgo, which will occur when the road speed of the vehicle incorporating this transmission system is lower than said certain second predetermined road speed, then said valve spool member 82 is shifted to its upward shifted position as seen to the left of the central axis of the valve bore of the fail safe valve 39 in the drawing.

The fail safe valve 39 is provided with nine switched ports 59, 90, 80, 100, 86, 58, 88, 87, and 84. Of these ports, the ports 59, 90, and 100 are drain ports. When the valve spool member 82 is in its downwardly biased position within the valve bore as seen on the right of the central axis of the valve bore in the drawing, then the ports 86, 90, and 100 are not connected to any other ports, while the ports 58 and 59 are communicated to one another, the ports 87 and 88 are communicated to one another, and the ports 84 and 80 are also communicated to one another. On the other hand, when the valve spool member 82 is in its upwardly biased position within the valve bore of the fail safe valve 39 as seen on the left of the central axis of the valve bore in the drawing, then the port 59, the port 87, and the port 80 are not connected to any other ports, while the ports 86 and 58 are communicated to one another, the ports 88 and 90 are communicated to one another, and the ports 84 and 81 are also communicated to one another.

CONNECTIONS OF THE FAIL SAFE VALVE

These switching ports of the fail safe valve 39 are connected as follows. The control port 83 is connected, via the hydraulic fluid conduit 95, the first lock up clutch interrupt valve 60, and the hydraulic fluid conduit 63, to the hydraulic fluid pressure control system 27, for receiving supply of the governor hydraulic fluid pressure Pgo, as previously explained. As explained above, the ports 59, 90, and 100 are drain ports. The port 80 is connected via a hydraulic fluid conduit 79 to the port 78 of the second lock up clutch interrupt valve 70. The ports 86 and 87 are connected, via the hydraulic fluid conduit 43, to the hydraulic fluid pressure control system 27, for always receiving supply of the torque converter hydraulic fluid pressure Pq. The port 58 is connected via a hydraulic fluid conduit 57 to the port 56 of the lock up clutch control valve 38. The port 88 is connected, via a hydraulic fluid conduit 89, to the port 55 of the lock up clutch control valve 38. And the port 84 is connected, via a hydraulic fluid conduit 85, to the port 88 of the lock up clutch control valve 38.

FUNCTION OF THE FAIL SAFE VALVE

Thus, when the vehicle road speed is below said certain second predetermined value, then the valve spool member 82 of the fail safe valve 39 is in its upwardly biased position within the valve bore of the fail safe valve 39 as seen on the left of the central axis of the valve bore in the drawing, and at this time even if any hydraulic fluid pressure is present at the port 80 of the fail safe valve 39 this hydraulic fluid pressure is not communicated to the port 84 thereof, which is instead connected to the drain port 81; while, on the other hand, when the vehicle road speed is above said certain second predetermined value, then the valve spool member 82 of the fail safe valve 39 is in its downwardly biased position within the valve bore of the fail safe valve 39 as seen on the right of the central axis of the valve bore in the drawing, and at this time any hydraulic fluid pressure present at the port 80 of the fail safe valve 39 is communicated to the port 84 thereof, which is connected via the hydraulic fluid conduit 85 to the intermediate control port 53 of the lock up clutch control valve 38. Thus in summary (including the condition arrived at previously, relating to the presence of hydraulic fluid pressure at the port 80 of the fail safe valve, with relation to the functioning of the second lock up clutch interrupt valve 70), the presence of hydraulic fluid pressure at the intermediate control port 53 of the lock up clutch control valve 38 indicates vehicle operation at a road speed greater than said second predetermined road speed value at fairly low vehicle throttle opening in the third speed stage, in the shown preferred embodiment.

Further, as explained above to some extent with relation to the functioning of the lock up clutch control valve 38, according as the valve spool member 82 of this fail safe valve 39 moves between its upper and its lower positions within the bore thereof, i.e. according as the vehicle road speed is below or is above said second predetermined vehicle road speed value, assuming that the valve spool member 40 of the lock up clutch control valve 38 is in its upwardly biased position within the valve bore thereof, as seen to the right of the central axis of this valve bore in the drawing, respectively either: (a) the hydraulic fluid pressure control system 27 supplies the torque converter hydraulic fluid pressure Pq to the port 56 of the lock up clutch control valve 38, via the hydraulic fluid conduit 43, the ports 86 and 58 of the fail safe valve 39 which are now communicated, and the hydraulic fluid conduit 57, whence this pressure is transmitted to the port 46 thereof, whence it is transmitted as in the previous case, via the hydraulic fluid conduit 47, to the second hydraulic fluid aperture 13 of the torque converter housing 4, from which said hydraulic fluid passes in through this second hydraulic fluid aperture 13 to the space 15 inside of the torque converter housing 4 to the left in the drawing of the lock up clutch plate 3, between the lock up clutch plate 3 and the end wall 4a of the torque converter housing 4, fills the inside of the torque converter housing 4 as is of course required, flows past the outer edge of the lock up clutch plate 3, between the lining 91 mounted on this outer edge and the end wall 4a of the torque converter housing 4, to the space 14 inside the torque converter housing 4 to the right in the drawing of the lock up clutch plate 3, and is taken out from the first hydraulic fluid aperture 12 from this space 14 inside of the torque converter housing 4 to the right in the drawing of the lock up clutch plate 3, and passes through the conduit 48 to the port 49 of the lock up clutch control valve 38, whence it is communicated to the port 55 thereof, whence it is drained to the hydraulic fluid reservoir 28 via the hydraulic fluid conduit 89 and the ports 88 and 90 of the fail safe valve 39 which are now communicated; or (b) the hydraulic fluid pressure control system 27 supplies the torque converter hydraulic fluid pressure Pq to the port 55 of the lock up clutch control valve 38, via the ports 87 and 88 of the fail safe valve 39 which are now communicated and the hydraulic fluid conduit 89, whence this pressure is transmitted to the port 49 thereof, whence it is transmitted via the hydraulic fluid conduit 48 to the first hydraulic fluid aperture 12 of the torque converter housing 4, from which said hydraulic fluid passes in through this first hydraulic fluid aperture 12 to the space 14 inside of the torque converter housing 4 to the right in the drawing of the lock up clutch plate 3, fills the inside of the torque converter housing 4 as is of course required, flows past the outer edge of the lock up clutch plate 3, between the lining 91 mounted on this outer edge and the end wall 4a of the torque converter housing 4, to the space 15 inside the torque converter housing 4 to the left in the drawing of the lock up clutch plate 3, between the lock up clutch plate 3 and the end wall 4a of the torque converter housing 4, and is taken out from the second hydraulic fluid aperture 13 from this space 15 inside of the torque converter housing 4 to the left in the drawing of the lock up clutch plate 3, and passes through the conduit 47 to the port 46 of the lock up clutch control valve 38, whence it is communicated to the port 56 thereof, whence it is drained to the hydraulic fluid reservoir 28 via the hydraulic fluid conduit 57 and the ports 58 and 59 of the fail safe valve 39 which are now communicated.

In case (a), as explained above, the flow of hydraulic fluid causes an excess of hydraulic fluid pressure on the left side in the FIGURE of the clutch plate 3 over the hydraulic fluid pressure on the right side thereof, and this pressure difference ensures that the clutch plate 3 as a whole is biased to the right in the FIGURE, and is pressed away from the end wall 4a of the torque converter housing 4, and does not rotationally engage said end wall 4a via the lining 91, thus causing the clutch plate 3 and the torque converter housing 4 not to be mechanically rotationally coupled together. Accordingly, the lock up clutch assembly of the torque converter 1 is disengaged.

On the other hand, in case (b), as also explained above, the flow of hydraulic fluid causes an excess of fluid pressure on the right side in the FIGURE of the clutch plate 3 over the fluid pressure on the left side thereof, and this pressure difference ensures that the clutch plate 3 as a whole is biased to the left in the FIGURE, and is pressed tightly against the end wall 4a of the torque converter housing 4, via the lining 91, thus causing the clutch plate 3 and the torque converter housing 4 to be mechanically rotationally coupled together. Accordingly, the lock up clutch assembly of the torque converter 1 is engaged.

NORMAL FUNCTION OF THE ENTIRE SYSTEM

Now, the functioning of the entire system will be explained, in the case of normal operation when none of the valves is sticking, and in particular when the lock up clutch control valve 38 is not sticking. Since the finer details of the structure and functions of each of the valves have already been explained individually, only the overall cooperation of the various parts of the composite system will be explained.

First, it should be appreciated that the second predetermined road speed value, mentioned above with respect to the to and fro movement of the fail safe valve 30, should be substantially lower than the first predetermined road speed value, mentioned above with respect to the to and fro movement of the first lock up clutch interrupt valve 60. In fact, the second predetermined road speed value, which relates to the fail safe valve 39, should be approximately the lowest road speed at which the vehicle can satisfactorily function with the lock up clutch assembly engaged in the overdrive speed stage, without the low revolution speed of the engine of the vehicle causing irregular operation thereof such as stalling, snatching, misfiring, or poor acceleration. This is because the function of the fail safe valve 39 is only as a backup or fail safe system, in order to prevent stalling of the vehicle due to improper low speed engagement of the lock up clutch assembly.

Next, it should be remarked that the lock up clutch assembly is engaged when and only when the valve spool member 40 of the lock up clutch control valve 38 is in its upward position within the valve bore thereof, as seen in the drawing, and also the valve spool member 82 of the fail safe valve 39 is in its downward position within the valve bore thereof, as seen in the drawing. This will occur when and only when the vehicle road speed is higher than said second predetermined road speed value, and also hydraulic fluid pressure is present at either the lower control port 54 or the intermediate control port 53 of the lock up clutch control valve 38; i.e., as explained above, when and only when the vehicle road speed is higher than said second predetermined road speed value and either (a) the gear transmission mechanism 2 is selected to be in its overdrive speed stage and the vehicle road speed is higher than said first predetermined road speed value, or (b) the gear transmission mechanism 2 is selected to be in its directly connected speed stage (i.e. its speed stage which is one speed stage below the overdrive speed stage) and the throttle opening of the throttle of the vehicle is less than said certain predetermined throttle opening.

Of course, in case (a), the condition with respect to the vehicle road speed being greater than said second predetermined road speed value is irrelevant; and so the final condition for engagement of the lock up clutch assembly, in normal operation of the system, is: either overdrive speed stage should be selected with the road speed of the vehicle higher than said first predetermined road speed value, or directly engaged speed stage should be engaged with throttle opening less than said certain predetermined throttle opening and with vehicle road speed higher than said second predetermined road speed value.

The consequences of the above described implementation of this condition for vehicle operation are very beneficial with regard to fuel economy of the vehicle, and at the same time vehicle performance and drivability are not significantly deteriorated by the engagement of the lock up clutch assembly, which occurs in the directly connected speed stage as well as the overdrive speed stage. This is because, when the throttle opening of the vehicle is made by the driver to be greater than said predetermined value of throttle opening, i.e. when it is desired by the driver to accelerate the vehicle sharply, then the lock up clutch assembly is automatically disengaged, so as to allow the torque converter 1 to provide its torque multiplication function.

For example, consider the case in which the vehicle is operating in overdrive speed stage with the lock up clutch engaged, i.e. at a road speed higher than said first predetermined vehicle road speed, and suppose that vehicle road speed gradually drops, with the throttle of the vehicle of course at this time opened by a relatively small amount. In this case, when the vehicle road speed drops to below said first predetermined vehicle road speed, while the transmission is still selected to the overdrive speed stage, the lock up clutch assembly will be disengaged. If now, however, the transmission shifts down to the directly connected speed stage, then once again the lock up clutch assembly will be engaged, provided that vehicle road speed remains higher than said second predetermined road speed value, and provided that the vehicle throttle opening remains relatively small. On the other hand, when it is desired to accelerate the vehicle, then the vehicle throttle opening will be increased by the driver, and in this case the lock up clutch assembly is once again disengaged, as soon as throttle opening becomes higher than said predetermined value thereof, so as to obtain the torque multiplication function of the torque converter assembly.

It should be noted that the present invention could also be adapted to the selective engagement of the lock up clutch assembly in other non overdrive speed stages of the gear transmission mechanism 2 than the directly connected speed stage. For instance, in another possible different embodiment, if the hydraulic fluid pressure which is supplied to the port 75 of the second lock up clutch interrupt valve 70 is not the hydraulic fluid pressure Pd, which as explained above is present when and only when the low/direct gear transmission mechanism 25 is providing its directly connected speed stage, but is a hydraulic fluid pressure which is present when and only when the low/direct gear transmission mechanism 25 is providing its directly connected speed stage or its speed stage next below its said directly connected speed stage, then the function of the lock up clutch is available in said speed stage next below said directly connected speed stage, as well as in said overdrive speed stage and in said directly connected speed stage; and, in said speed stage next below said directly connected speed stage, said lock up clutch assembly is again engaged when and only when the vehicle road speed is higher than said second predetermined road speed value and the throttle opening of the throttle of the vehicle is less than said certain predetermined throttle opening. No modification would need to be made to any of the other details of the shown construction.

FAIL SAFE FUNCTION OF THE ENTIRE SYSTEM

Now, the functioning of the entire system will be explained, in the case of abnormal operation thereof wherein the lock up clutch control valve 38 is sticking. Again, only the overall cooperation of the various parts of the composite system will be explained.

First, it should be appreciated that the to and fro operation of the fail safe valve 39, as described above, is important for disengaging of the lock up clutch assembly, when the direct speed stage of the gear transmission mechanism 2 is engaged, and vehicle road speed drops below said second predetermined road speed value. In this sense, the valve 39 is not operating at this time as a fail safe valve. However, when the overdrive speed stage of the gear transmission mechanism 2 is engaged, said valve 39 has a very important fail safe function.

That is, suppose that the valve spool member 40 of the lock up clutch control valve 38 sticks in its upward position within the valve bore thereof, as seen on the right side of the central axis of the valve bore in the drawing. In this case, the operation of the first lock up clutch interrupt valve 60 for disengaging the lock up clutch when vehicle road speed drops below said first predetermined road speed value as vehicle road speed drops becomes ineffective, because even though the supply of hydraulic fluid pressure to the lower control port 54 of the lock up clutch control valve 38 by said first lock up clutch interrupt valve 60 is stopped, the valve spool element 40 thereof remains in the upwards position, because it is stuck. However, if vehicle road speed further drops so as to become below said second predetermined road speed value, then the valve spool member 82 of the fail safe valve will move from its downwardly biased position within the valve bore thereof to its upwardly biased position therein, thus, as explained above, reversing the senses of supply of hydraulic fluid pressure to, and of draining of hydraulic fluid from, the lock up clutch assembly, and thus disengaging the lock up clutch. This fail safe operation is very important for preventing stalling of the engine of the vehicle, in the event of sticking of the lock up clutch control valve 38, which could otherwise make the vehicle completely inoperable.

Although the present invention has been shown and described with reference to a preferred embodiment thereof, and in terms of the illustrative drawing, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawing, but solely by the scope of the appended claims, which follow.

What is claimed is:

1. In an automatic transmission for an engine driven vehicle comprising:

(a) a gear transmission mechanism comprising a plurality of hydraulic fluid pressure activated friction engaging mechanisms, including a first friction engaging mechanism which, when engaged, provides a highest speed stage, and a second friction engaging mechanism which, when engaged, provides a next to highest speed stage, provided that the other friction engaging mechanisms are engaged or disengaged according to a particular predetermined pattern of combination of engagement and disengagement; and (b) a torque converter with a lock up clutch, comprising a first and second hydraulic fluid channel communicated with an interior of said torque converter, said lock up clutch being selectively engaged or disengaged according to whether hydraulic fluid pressure is supplied to said first hydraulic fluid channel and is released from said second hydraulic fluid channel or it is supplied to said second hydraulic fluid channel and is released from said first hydraulic fluid channel;

a transmission control system comprising:

(c) a source of hydraulic fluid pressure;

(d) a line hydraulic fluid pressure control valve which produces a line hydraulic fluid pressure from said source;

(e) a governor hydraulic fluid pressure control valve which produces a governor hydraulic fluid pressure from said line hydraulic fluid pressure, said governor hydraulic fluid pressure being representative of vehicle speed and increasing with increase of vehicle speed;

(f) a converter hydraulic fluid pressure control valve which produces a converter hydraulic fluid pressure from said source;

(g) a speed shift valve which switches over a supply of said line hydraulic fluid pressure alternatively to provide a brake hydraulic fluid pressure when said gear transmission is to provide said highest speed stage or to provide a clutch hydraulic fluid pressure when said gear transmission is to provide said next to highest speed stage;

(h) a lock up clutch control valve comprising a housing formed with a bore, a valve spool member and a piston member coaxially fitted within said bore so as to abut against one another by their ends, and a spring which biases said valve spool member towards said piston, a first chamber being defined at one end of said piston member towards said piston, a first chamber being defined at one end of said piston member remote from said valve spool member, to which said piston member exposes a first effective pressure receiving surface, a second chamber being defined around meeting ends of said valve spool member and said piston member, to which said valve spool member exposes a second effective pressure receiving surface; and a third chamber being defined at another end of said valve spool member remote from said piston member, to which said valve spool member exposes a third effective pressure receiving surface, said third effective pressure receiving surface being so small as compared with first and second effective pressure receiving surfaces that said valve spool member is shifted toward said third chamber when either said first or second chamber is supplied with said line hydraulic fluid pressure while said third chamber is supplied with said line hydraulic fluid pressure, said lock up clutch control valve being switched over so as to supply said converter hydraulic fluid pressure to said first hydraulic fluid channel while releasing said second hydraulic fluid channel when said valve spool member is shifted toward said third chamber, and to supply said converter hydraulic fluid pressure to said second hydraulic fluid channel while releasing said first hydraulic fluid channel when said valve spool member is shifted toward said second chamber; and (i) a lock up clutch control hydraulic fluid circuit, including a least one switch-over valve which is actuated by said governor hydraulic fluid pressure and conducts said brake hydraulic fluid pressure and said clutch hydraulic fluid pressure separately to one and the other of said first and second chambers of said lock up clutch control valve when said governor hydraulic fluid pressure is higher than a predetermined value, while constantly supplying said line hydraulic fluid pressure to said third chamber of said lock up clutch control valve.

2. A transmission control system according to claim 1, further comprising a throttle hydraulic fluid pressure control valve which produces a throttle hydraulic fluid pressure from said line hydraulic fluid pressure, said throttle hydraulic fluid pressure being representative of engine load and increasing with increase of engine load, wherein said lock up clutch control hydraulic fluid circuit further comprises a second switch over valve which is actuated by said throttle hydraulic fluid pressure and is connected in series with said switch over valve actuated by said governor hydraulic fluid pressure in conducting said clutch hydraulic fluid pressure, said second switch over valve allowing conduction of said clutch hydraulic fluid pressure when said throttle hydraulic fluid pressure is lower than a predetermined value.

* * * * *